United States Patent
Storozuk

(10) Patent No.: US 9,126,672 B2
(45) Date of Patent: Sep. 8, 2015

(54) ACCESS DOOR ASSEMBLY AND METHOD OF MAKING THE SAME

(75) Inventor: Marc Storozuk, Winnipeg (CA)

(73) Assignee: The Boeing Company, Chicago, IL (US)

( * ) Notice: Subject to any disclaimer, the term of this patent is extended or adjusted under 35 U.S.C. 154(b) by 1012 days.

(21) Appl. No.: 13/251,221

(22) Filed: Oct. 1, 2011

(65) Prior Publication Data
US 2013/0082143 A1   Apr. 4, 2013

Related U.S. Application Data

(63) Continuation-in-part of application No. 13/249,249, filed on Sep. 30, 2011.

(51) Int. Cl.
| | | |
|---|---|---|
| B64C 1/14 | (2006.01) | |
| B64G 1/22 | (2006.01) | |
| B63B 19/14 | (2006.01) | |
| E02D 29/14 | (2006.01) | |
| E06B 5/00 | (2006.01) | |
| B64C 1/06 | (2006.01) | |

(Continued)

(52) U.S. Cl.
CPC .............. *B64C 1/1446* (2013.01); *B64C 1/069* (2013.01); *B64C 1/12* (2013.01); *B64C 2001/0081* (2013.01); *Y02T 50/42* (2013.01)

(58) Field of Classification Search
CPC .... B64C 1/1446; B64C 1/1407; B64C 1/1461
USPC .................. 244/129.4, 158.1; 404/25; 52/19; 114/203; 49/463
See application file for complete search history.

(56) References Cited

U.S. PATENT DOCUMENTS 5,797,221 A * 8/1998 Young et al. ............. 52/20
6,684,569 B2   2/2004 Gineris et al.
(Continued)

FOREIGN PATENT DOCUMENTS

CN   101500787 A   8/2009
DE   20018289 U1   1/2001
(Continued)

OTHER PUBLICATIONS

PCT International Preliminary Report on Patentability and Written Opinion of the International Searching Authority for Counterpart International Application No. PCT/US2012/052707, Report Issued Apr. 1, 2014, Applicant The Boeing Company, 7 pages.
PCT International Search Report and Written Opinion of the International Searching Authority for Counterpart International Application No. PCT/US2012/052707, ISR Mailed May 14, 2013, Applicant The Boeing Company, 11 pages.
(Continued)

*Primary Examiner* — Rob Swiatek

(57) ABSTRACT

An access door assembly for joining to a structure. The access door assembly has an access door with at least one access door nonlinear edge, a support structure with at least one support structure nonlinear edge, and a doubler element attached to an interior side of the support structure. The support structure nonlinear edge is designed to interlace with the access door nonlinear edge to form an access door assembly for joining to a structure, the access door assembly having an interlaced nonlinear edge interface. A diameter of the doubler element of the access door assembly is preferably reduced as compared to a diameter of a doubler element of an access door assembly having a linear or circular edge, such that the reduced diameter preferably results in an overall reduced weight of the access door assembly and the structure to which the access door assembly is joined.

22 Claims, 20 Drawing Sheets

(51) Int. Cl.
  *B64C 1/12* (2006.01)
  *B64C 1/00* (2006.01)

(56) References Cited

U.S. PATENT DOCUMENTS

| | | | |
|---|---|---|---|
| 7,059,090 B2 | 6/2006 | Tsetsorin | |
| 7,726,903 B2 * | 6/2010 | Vrondran et al. | 404/25 |
| 2003/0213095 A1 | 11/2003 | Jackson | |
| 2007/0016336 A1 | 1/2007 | Chapin, II | |
| 2009/0064681 A1 | 3/2009 | Keith et al. | |
| 2009/0078820 A1 | 3/2009 | Lin et al. | |
| 2009/0166473 A1 | 7/2009 | Zuniga Sagredo | |
| 2009/0184200 A1 | 7/2009 | Lin et al. | |

FOREIGN PATENT DOCUMENTS

| | | |
|---|---|---|
| WO | WO2009083575 A2 | 7/2009 |
| WO | 2011003222 A1 | 1/2011 |

OTHER PUBLICATIONS

PCT International Search Report and Written Opinion of the International Searching Authority for Related Parent Counterpart International Application No. PCT/US2012/052259, ISR Mailed May 14, 2013, Applicant The Boeing Company, 11 pages.

PCT International Preliminary Report on Patentability and Written Opinion of the International Searching Authority for Related International Application No. PCT/US2012/052259, Mailed Apr. 10, 2014, Applicant The Boeing Company, 10 pages.

Office Action issued by the Canadian Intellectual Property Office (CIPO), on Mar. 26, 2015, for counterpart CA application No. 2,844,995, based on PCT No. US2012052707, for Applicant The Boeing Company, 5 pages.

Chinese Version of Office Action issued by the State Intellectual Property Office (SIPO) of P.R.C., on Mar. 27, 2015, for counterpart Chinese Application No. 2012800475457, based on PCT No. US2012052707, for Applicant The Boeing Company, 7 pages.

\* cited by examiner

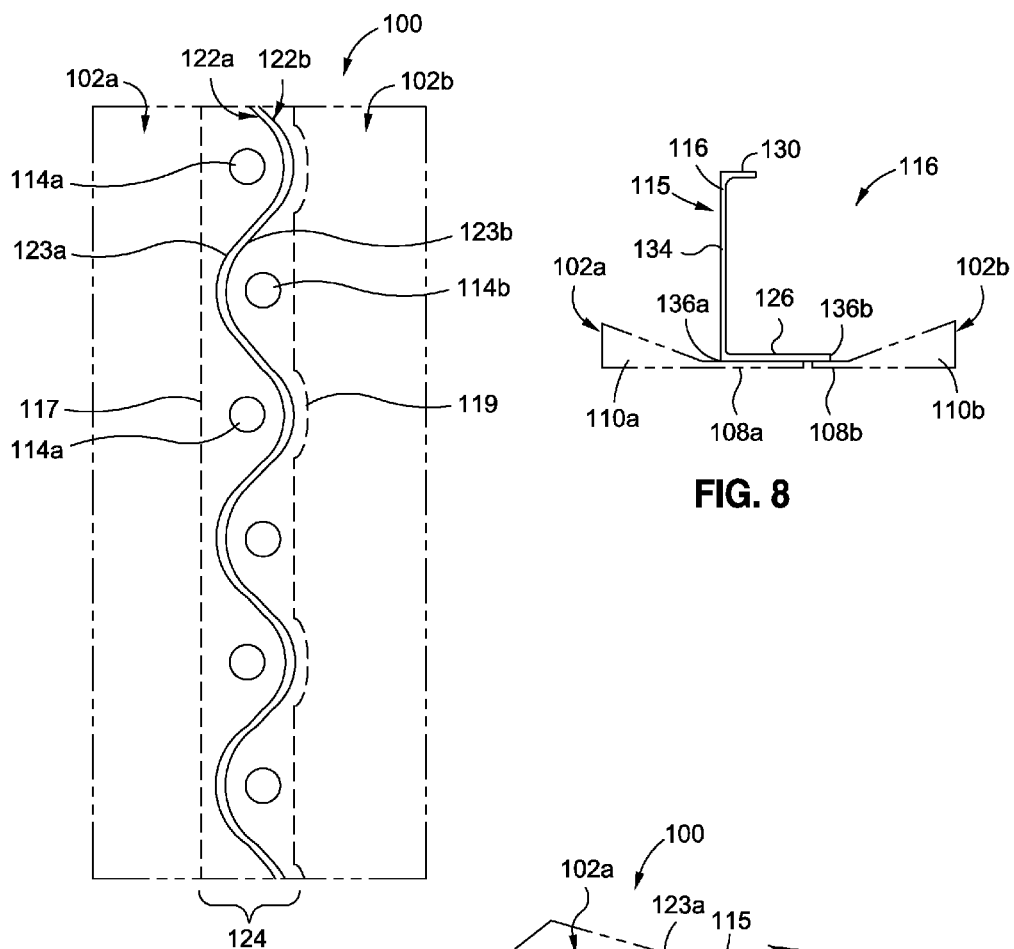
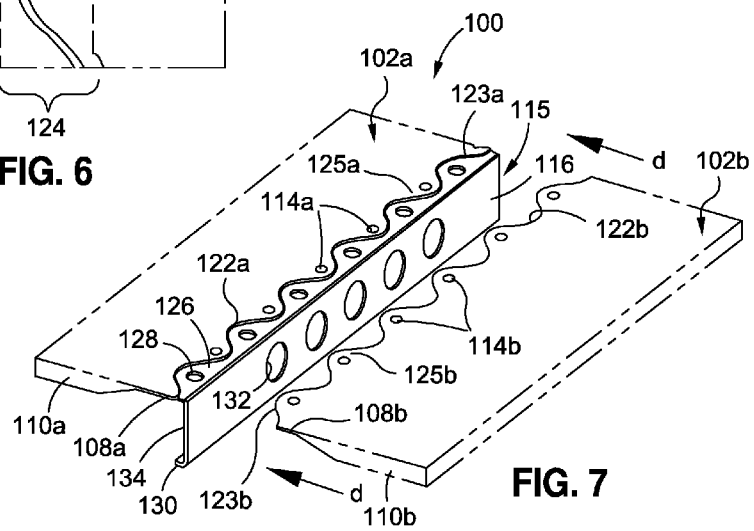

ACCESS DOOR ASSEMBLY AND METHOD OF MAKING THE SAME

CROSS-REFERENCE TO RELATED APPLICATIONS

The present application is a continuation-in-part application of and claims priority to pending U.S. application Ser. No. 13/249,249, filed on Sep. 30, 2011, and entitled "PANEL ASSEMBLY AND METHOD OF MAKING THE SAME", the entire contents of which is expressly incorporated by reference herein.

BACKGROUND

1) Field of the Disclosure

The disclosure relates generally to panel and access door assemblies for attachment to structures, and more particularly, to panel and access door assemblies having unique edgebands for attachment to structural frames of vehicles, such as aircraft, and other structures.

2) Description of Related Art

In many applications, panels and access doors may be assembled by mechanically fastening the panels together and portions of the access doors together with one or more rows of fasteners, such as rivets, bolts, screws, or other fasteners, by chemically bonding the panels together and portions of the access doors with an adhesive or another chemical bonding element, or by another means of joining or fastening known in the art. Such panel assemblies and/or access door assemblies may be attached to structural frames or other structures or parts of various transport vehicles, such as aircraft, spacecraft, rotorcraft, watercraft, automobiles, trucks, buses, or other transport vehicles, or of architectural structures such as buildings, bridges, or other structures.

In particular, an aircraft fuselage or body may be manufactured with multiple skin panels mechanically fastened together both circumferentially and longitudinally with rows of fasteners such as metal rivets. Such skin panels may be used to form fairings which are structures to reduce drag and to produce a smooth outline and appearance of the aircraft. Fairings, such as wing-to-body fairings, provide an aerodynamic shell between the wing and the fuselage or body of an aircraft to form the outer skin of the aircraft. Known wing-to-body fairing panel assemblies typically have panels with a linear or straight edge between two adjacent panels attached to an aircraft structural frame.

Illustrations of known wing-to-body fairing panel assemblies are shown in FIGS. 2A-2C and FIGS. 3-4. FIG. 2A is an illustration of an interior side perspective view of a known aircraft wing-to-body fairing panel assembly 30 formed of panel elements 32a, 32b having linear or straight edges 34a, 34b (see also FIG. 2C), respectively. As shown in FIGS. 2A-2C, the panel elements 32a, 32b may have, respectively, sides 36a, 36b that may or may not be attached to further panel elements; edgebands 38a, 38b having an edgeband width 54 (see FIG. 2B) and each edgeband 38a, 38b having one or more rows of panel openings 44a, 44b (see FIG. 2B); honeycomb core portions 40a, 40b with ramped portions 41a, 41b (see FIG. 2A); interior surfaces 50a, 50b (see FIG. 2A); and, exterior surfaces 52a, 52b (see FIG. 2C). The panel elements 32a, 32b may typically be made of composite material and/or metal material, and the edgebands 38a, 38b, although thinner in width than the honeycomb core portions 40a, 40b, typically weigh more than the honeycomb core portions 40a, 40b due to the use of lighter weight material in the honeycomb core portions 40a, 40b and the use of heavier weight material in the edgebands 38a, 38b.

FIG. 2B is an illustration of an interior front perspective view of the known aircraft wing-to-body fairing panel assembly 30 of FIG. 2A. FIG. 2C is an illustration of an exterior perspective view of the known aircraft wing-to-body fairing panel assembly 30 of FIG. 2A. As shown in FIG. 2B, the panel elements 32a, 32b may be joined to first end edges 42a, 42b, having a J-profile 48, of an aircraft structural frame element 46 via frame openings 58a, 58b that correspond to the panel openings 44a, 44b of the panel elements 32a, 32b. The panel elements 32a, 32b are joined to the aircraft structural frame element 46 and, in turn, to each other, via fasteners 56 (see FIGS. 2C, 3) inserted through the panel openings 44a, 44b and corresponding frame openings 58a, 58b.

FIG. 3 is an illustration of a close-up perspective view of an exterior portion of the panel element 32a of the known aircraft wing-to-body fairing panel assembly 30 of FIG. 2A joined to the aircraft structural frame element 46. As shown in FIG. 3, the aircraft structural frame element 46 further has a second end edge 60 and a body 62 with openings 64.

FIG. 4 is an illustration of an interior perspective view of an interface 66 between the two adjacent panel elements 32a, 32b of the known aircraft wing-to-body fairing panel assembly 30 of FIG. 2A. The interface 66 is formed between the linear or straight edges 34a, 34b. The edgeband width 54 is formed between an end 68 of the edgeband 38a and an end 70 of the edgeband 38b.

The use of a double row of fasteners or multiple rows of fasteners in the edgeband width of such known panel assemblies as shown in FIGS. 2A-2C and FIGS. 3-4 may increase the edgeband width, and, in turn, may increase the amount of heavier material that may be used in the edgebands. This may result in an increase in the overall weight of the panel assemblies and the structure to which it is attached. Moreover, the use of a double row of fasteners or multiple rows of fasteners in the edgeband width may increase the number of fasteners needed to assemble the panel assemblies. This may further result in an increase in the overall weight of the panel assemblies and the structure to which it is attached. Finally, with the use of an increased number of fasteners, the cost of manufacturing the panel assemblies may increase due to increased time and labor that may be required to install the fasteners.

Illustrations of removable, non-hinged, known access door assemblies are shown in FIGS. 15A-15D. FIG. 15A is an illustration of an exterior perspective view of a known access door assembly 300. FIG. 15B is an illustration of an exterior perspective view of the known access door assembly 300 of FIG. 15A with an access door 302 removed. FIG. 15C is an illustration of an interior perspective view of the known access door assembly 300 of FIG. 15A. FIG. 15D is an illustration of an interior perspective view of the known access door assembly 300 of FIG. 15A with the access door 302 removed.

As shown in FIG. 15A, the known access door assembly 300 has an access door 302 with a circular edge 303 (alternatively, the edge may be linear), an exterior side 304, an interior side 306 (see FIG. 15C), and a plurality of access door openings 308. As further shown in FIG. 15A, the known access door assembly 300 has a support portion 310 adjacent the access door 302 having an exterior side 312, an interior side 314 (see FIG. 15C), and a plurality of support portion openings 316.

As shown in FIG. 15B, the known access door assembly 300 further has a doubler 318 attached to the support portion 310 and has an exterior side 320, an interior side 322 (see FIG. 15D), and a double row plurality of doubler openings 324a, 324b (see FIG. 15D). The access door 302 is designed to fit against a recessed edge portion 326 over the doubler 318 and flush with the exterior side 312 of the support portion 310.

As shown in FIG. 3A, the known access door assembly 300 is joined to a structure 328, such as an aircraft structural element 330, having an exterior side 332 and an interior side 334 (see FIG. 15D). FIG. 15B shows a diameter ($d_1$) 338 of the interior opening 336, and FIG. 15D shows a diameter ($d_2$) 340 of the doubler 318. The access door 302 may be joined to the doubler 318, and in turn, to the structure 328 via fastener elements 342 (see FIG. 15A) inserted through the access door openings 308 and the corresponding doubler openings 324a (see FIG. 15B). The structure portion 310 may be attached to the doubler 318 via fastener elements 342 (see FIG. 15A) inserted through the support portion openings 316 and the corresponding doubler openings 324b (see FIG. 15D). This results in a double row of fastener elements 342 on each side of the interface of the circular edge 303 of the access door 302 (see FIG. 15A).

The use of a double row of fastener elements or multiple rows of fastener elements in the known access door assemblies, such as known access door assembly 300, shown in FIGS. 15A-15D, may increase the diameter ($d_2$) 340 of the interior of the doubler 318 and, in turn, may increase the amount of doubler material used in the known access door assembly 300. This may result in an increase in the overall weight of such known access door assembly 300 and the structure 328 to which it is attached. Moreover, the use of a double row of fastener elements or multiple rows of fastener elements on each side of the interface of the circular edge 303 of the access door 302 may increase the number of fastener elements needed to assemble the known access door assembly 300. This may further result in an increase in the overall weight of the known access door assembly 300 and the structure 328 to which it is attached. Finally, with the use of an increased number of fastener elements, the cost of manufacturing such known access door assemblies may increase due to increased time and labor that may be required to install the fastener elements.

Accordingly, there is a need in the art for an improved panel assembly and method of making the same that provide advantages over known assemblies and methods. Further, there is a need in the art for an improved access door assembly and method of making the same that provide advantages over known assemblies and methods.

SUMMARY

This need for an improved panel assembly and method of making the same is satisfied. In addition, this need for an improved access door assembly and method of making the same is satisfied. As discussed in the below detailed description, embodiments of the improved panel assembly and method and improved access door assembly and method may provide significant advantages over known assemblies and methods.

In an embodiment of the disclosure, there is provided a panel assembly for joining to a structure. The assembly comprises a first panel element having at least one first panel nonlinear edge. The assembly further comprises a second panel element having at least one second panel nonlinear edge. The second panel nonlinear edge is designed to interlace with the first panel nonlinear edge to form a panel assembly with interlaced panel edgebands for joining to a structure. A width of the interlaced panel edgebands is reduced as compared to a width of adjacent panel edgebands formed by adjacent panel elements having linear edges, and the reduced width results in an overall reduced weight of the panel assembly and the structure to which the panel assembly is joined.

In another embodiment of the disclosure, there is provided a method of making a panel assembly for joining to a structure. The method comprises fabricating a first panel element having at least one first panel nonlinear edge. The method further comprises fabricating a second panel element having at least one second panel nonlinear edge, wherein the second panel nonlinear edge is designed to interlace with the first panel nonlinear edge. The method further comprises interlacing the first panel nonlinear edge with the second panel nonlinear edge to form a panel assembly with interlaced panel edgebands. The method further comprises joining the interlaced panel edgebands of the panel assembly to a structure. A width of the interlaced panel edgebands is reduced as compared to a width of adjacent panel edgebands formed by adjacent panel elements having linear edges. The reduced width results in an overall reduced weight of the panel assembly and the structure to which the panel assembly is joined.

In another embodiment of the disclosure, there is provided a method of making a scalloped panel assembly for joining to an aircraft. The method comprises fabricating a plurality of panel elements each having at least one scalloped edge comprising a plurality of rounded scalloped projections, wherein each rounded scalloped projection has a panel opening. The method further comprises interlacing the panel elements together such that the at least one scalloped edge of each panel element interlaces and corresponds with at least one adjacent scalloped edge of one or more adjacent panel elements to form a scalloped panel assembly with interlaced scalloped edgebands. The method further comprises joining one or more interlaced scalloped edgebands of the scalloped panel assembly to one or more aircraft structural frame elements. The method further comprises inserting a fastener element through each panel opening and through a corresponding frame opening provided in the aircraft structural frame element in order to fasten the one or more interlaced scalloped edgebands to the one or more aircraft structural frame elements. A width of the interlaced scalloped edgebands is reduced as compared to a width of adjacent panel edgebands formed by adjacent panel elements having linear edges. The reduced width results in an overall reduced weight of the scalloped panel assembly and the one or more aircraft structural frame elements to which the panel assembly is joined.

In another embodiment of the disclosure, there is provided an access door assembly for joining to a structure. The access door assembly comprises an access door comprising at least one access door nonlinear edge. The access door assembly further comprises a support structure comprising at least one support structure nonlinear edge. The access door assembly further comprises a doubler element attached to an interior side of the support structure. The support structure nonlinear edge is designed to interlace with the access door nonlinear edge to form an access door assembly for joining to a structure, the access door assembly having an interlaced nonlinear edge interface. A diameter of the doubler element of the access door assembly is preferably reduced as compared to a diameter of a doubler element of an access door assembly having a linear or circular edge, such that the reduced diameter preferably results in an overall reduced weight of the access door assembly and the structure to which the access door assembly is joined.

In another embodiment of the disclosure, there is provided an aircraft access door assembly for joining to an aircraft. The aircraft access door assembly comprises an access door comprising a scalloped edge configuration and a plurality of access door openings. The aircraft access door assembly further comprises a support structure comprising a scalloped edge configuration and a plurality of support structure openings. The aircraft access door assembly further comprises a doubler element attached to an interior side of the support structure, the doubler element having a plurality of doubler element openings. The scalloped edge configuration of the access door is designed to interlace with the scalloped edge configuration of the support structure to form an aircraft access door assembly for joining to an aircraft structure, the aircraft access door assembly having an interlaced scalloped interface. The aircraft access door assembly further comprises a plurality of fasteners for insertion through the access door openings and for insertion through doubler element openings corresponding to the access door openings in order to join the access door to the doubler element and to the aircraft structure. A diameter of the doubler element of the aircraft access door assembly is preferably reduced as compared to a diameter of a doubler element of a known access door assembly having a linear or circular edge, such that the reduced diameter preferably results in an overall reduced weight of the aircraft access door assembly and the aircraft structure to which the aircraft access door assembly is joined.

In another embodiment of the disclosure, there is provided a method of making an access door assembly for joining to a structure. The method comprises fabricating an access door having at least one access door nonlinear edge. The method further comprises fabricating a support structure having at least one support structure nonlinear edge, wherein the support structure nonlinear edge is designed to interlace with the access door nonlinear edge. The method further comprises attaching a doubler element to an interior side of the support structure. The method further comprises interlacing the access door nonlinear edge with the support structure nonlinear edge to form an access door assembly with an interlaced nonlinear edge interface. The method further comprises joining the access door assembly to a structure. A diameter of the doubler element of the access door assembly is preferably reduced as compared to a diameter of a doubler element of an access door assembly having a linear or circular edge, such that the reduced diameter preferably results in an overall reduced weight of the access door assembly and the structure to which the access door assembly is joined.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 6 is an illustration of an exterior view of one of the embodiments of a panel assembly of the disclosure;

FIG. 7 is an illustration of an exploded perspective view of one of the embodiments of a panel assembly of the disclosure attached to a structural frame element;

FIG. 8 is an illustration of a cross-sectional view of one of the embodiments of a panel assembly of the disclosure attached to a structural frame element;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
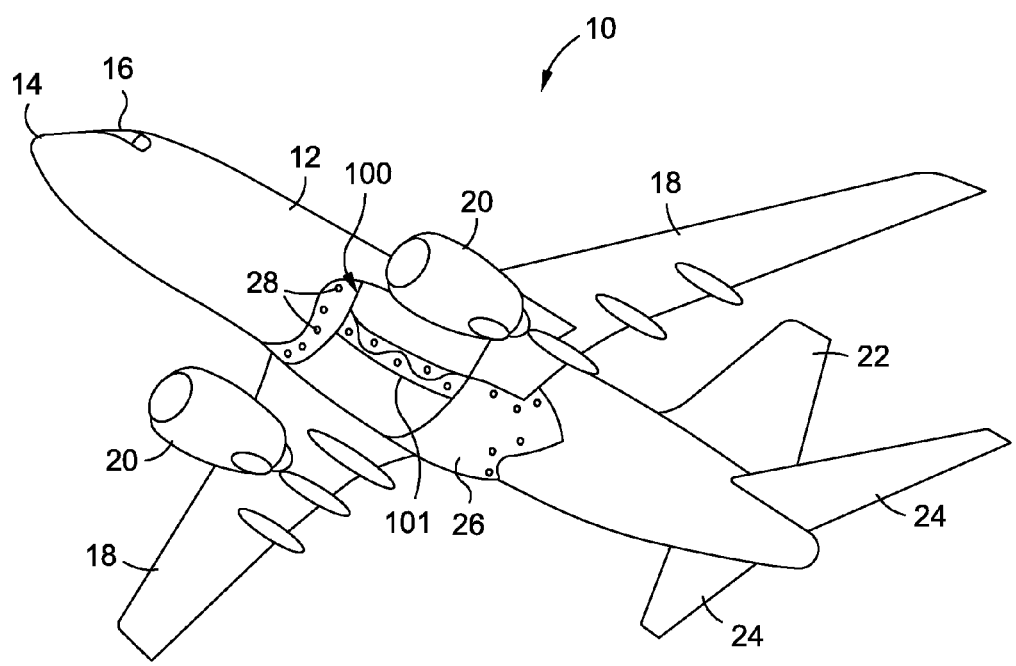
FIG. 1 is an illustration of a perspective view of an exemplary aircraft that may incorporate one or more advantageous embodiments of a panel assembly of the disclosure.

Now referring to the Figures, FIG. 1 is an illustration of a perspective view of an exemplary aircraft 10 that may incorporate one or more advantageous embodiments of a panel assembly 100 (see FIGS. 9A-9C) or a scalloped panel assembly 150 (see FIGS. 11A-11B) of the disclosure. As shown in FIG. 1, the aircraft 10 comprises a fuselage or body 12, a nose 14, a cockpit 16, wings 18 operatively coupled to the fuselage or body 12, one or more propulsion units 20, a tail vertical stabilizer 22, one or more tail horizontal stabilizers 24, and a wing-to-body fairing 26 with fasteners 28. FIG. 1 shows the panel assembly 100 incorporated in the wing-to-body fairing 26. Although the aircraft 10 shown in FIG. 1 is generally representative of a commercial passenger aircraft, the panel assembly 100, as well as the panel assembly 150, may also be employed in other types of aircraft. More specifically, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles. It may also be appreciated that embodiments of the assemblies, methods, and systems in accordance with the disclosure may be utilized in other transport vehicles, such as boats and other watercraft, trains, automobiles, trucks, buses, or other suitable transport vehicles. It may further be appreciated that embodiments of the assemblies, methods, and systems in accordance with the disclosure may be used in various structures where a panel may be attached to a structural element, such as buildings, bridges, or other suitable structures.

Figure 2A:
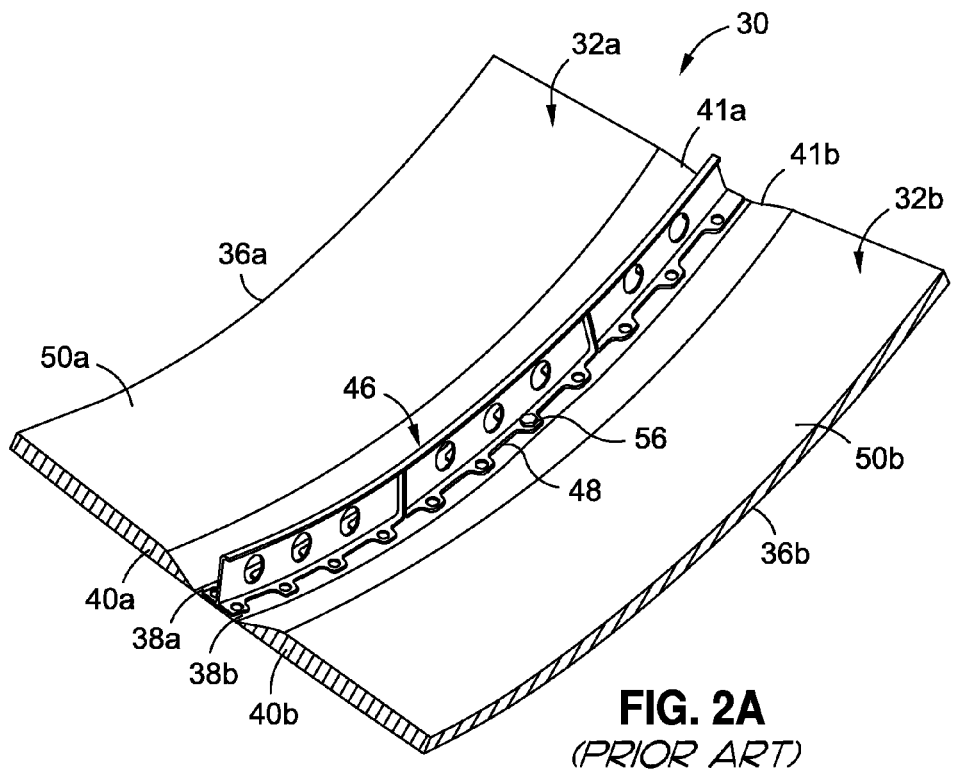
FIG. 2A is an illustration of an interior side perspective view of a known aircraft wing-to-body fairing panel assembly.
Figure 9A:
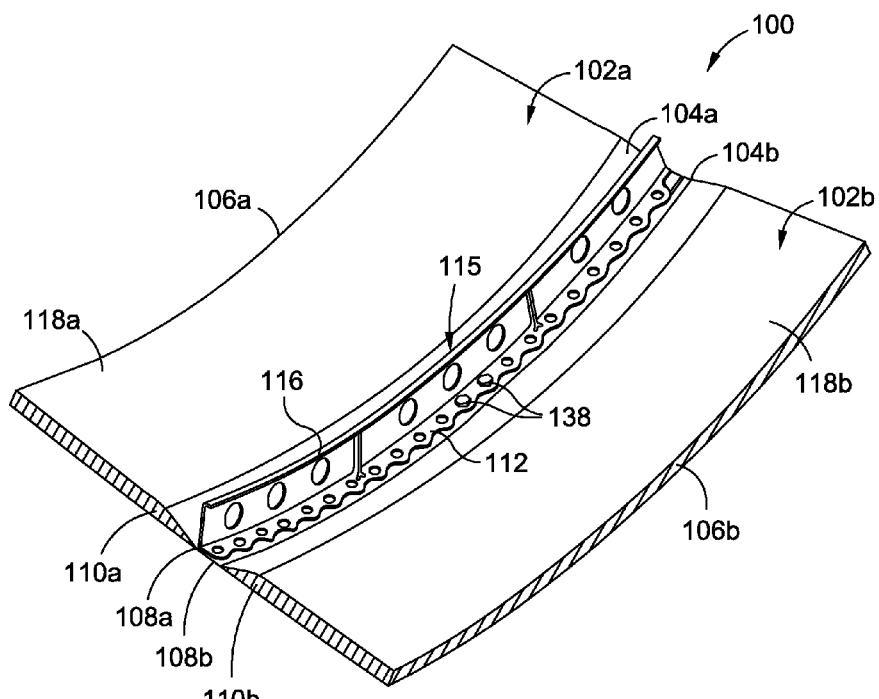
FIG. 9A is an illustration of an interior side perspective view of one of the embodiments of a panel assembly of the disclosure.
Figure 9B:
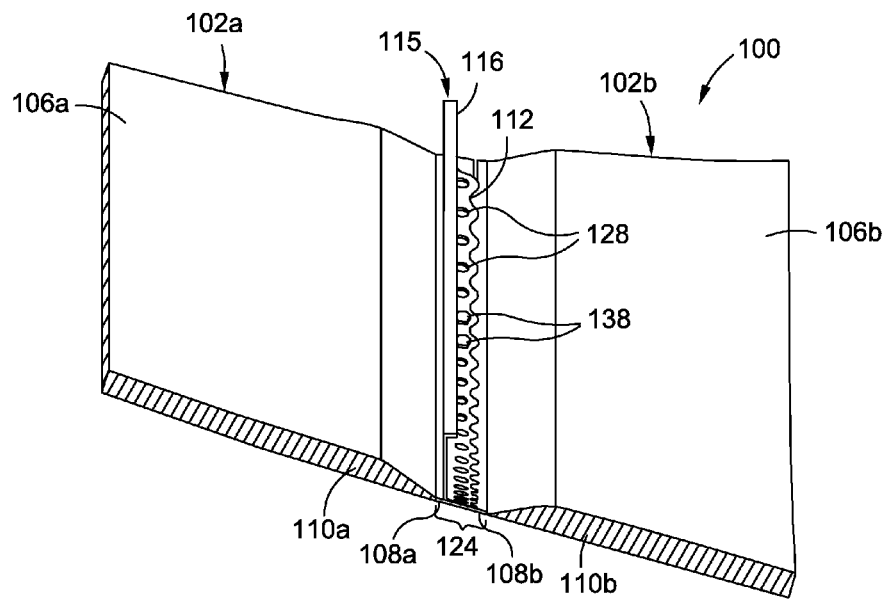
FIG. 9B is an illustration of an interior front perspective view of the panel assembly of FIG. 9A.
Figure 9C:
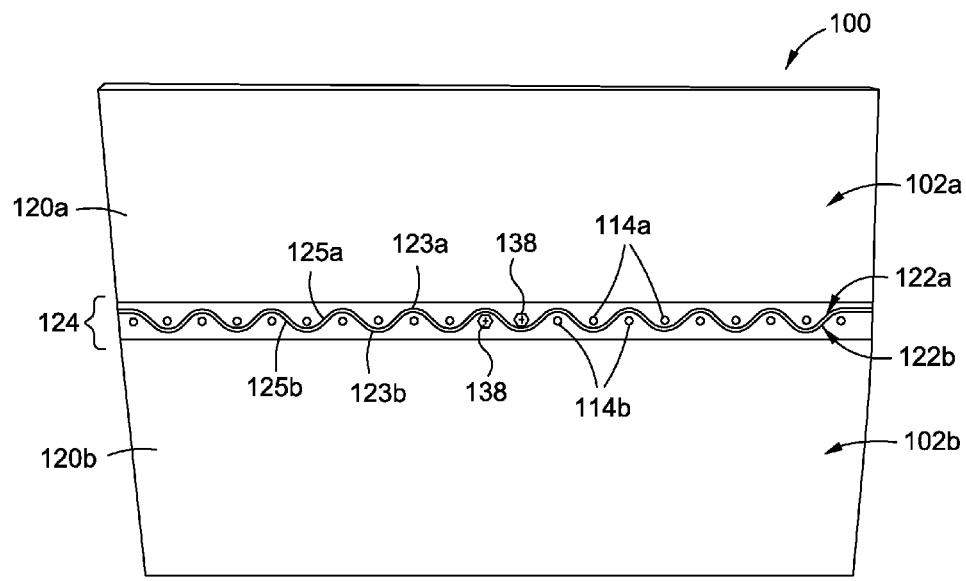
FIG. 9C is an illustration of an exterior perspective view of the panel assembly of FIG. 9A.

As shown in FIGS. 9A-9C, in one of the embodiments there is provided a panel assembly 100 for joining to a structure 115, such as a structural frame element 116. The structural frame element 116 may comprise an aircraft structural frame element 46 (see FIG. 2A). The structure 115 preferably has at least one panelized construction portion 101 (see FIG. 1). The structure 115 may comprise an aircraft 10 (see FIG. 1), a spacecraft, a satellite, a rotorcraft, a watercraft, a boat, a train, an automobile, a truck, a bus, a tractor trailer, a building or other architectural structure, or another suitable structure.

FIG. 9A is an illustration of an interior side perspective view of the panel assembly 100. FIG. 9B is an illustration of an interior front perspective view of the panel assembly 100 of FIG. 9A. FIG. 9C is an illustration of an exterior perspective view of the panel assembly 100 of FIG. 9A. As shown in FIG. 9A, the panel assembly 100 comprises a first panel element 102a having at least one first panel nonlinear edge 122a (see FIG. 9C). The panel assembly 100 further comprises a second panel element 102b having at least one second panel nonlinear edge 122b (see FIG. 9C). As shown in FIG. 9C, the first panel nonlinear edge 122a and the second panel nonlinear edge 122b preferably each have a scalloped or zippered edge configuration 123a, 123b, respectively, comprising a plurality of rounded scalloped projections 125a, 125b. Each rounded scalloped projections 125a, 125b may have panel openings 114a, 114b, respectively.

As shown in FIG. 9A, the first and second panel elements 102a, 102b each comprises a side 106a, 106b, respectively, that may or may not be attached to additional panel elements having nonlinear edges. The first and second panel elements 102a, 102b each further comprises an edgeband 108a, 108b (see FIG. 9A). When the first panel nonlinear edge 122a and the second panel nonlinear edge 122b are interlaced and first and second panel elements 102a, 102b are adjacent to each other, the edgebands 108a, 108b form an edgeband width 124 (see FIGS. 9B, 5). As shown in FIG. 9A, the first and second panel elements 102a, 102b each further comprises core portions 110a, 110b having ramped portions 104a, 104b. The first and second panel elements 102a, 102b each further comprises interior surfaces 118a, 118b (see FIG. 9A), respectively, and exterior surfaces 120a, 120b (see FIG. 9C), respectively.

The first and second panel elements 102a, 102b, may preferably be made of composite material and/or metal material. The edgebands 108a, 108b preferably each have a thinner or smaller width than the core portions 110a, 110b which each have a thicker or greater width. In addition, the edgebands 108a, 108b preferably each have a greater or heavier weight than the core portions 110a, 110b which each have a lesser or lighter weight. Preferably, the core portions 110a, 110b are comprised of a lighter weight material than the edgebands 108a, 108b. Preferably, the edgebands 108a, 108b are comprised of a heavier weight material than the core portions 110a, 110b.

As shown in FIG. 9C, preferably, the edgeband 108a of the first panel element 102a has a plurality of spaced panel openings 114a along the first panel nonlinear edge 122a. Preferably, the edgeband 108b of the second panel element 102b has a plurality of spaced panel openings 114b along the second panel nonlinear edge 122b. When the first panel nonlinear edge 122a is interlaced and joined with the second panel nonlinear edge 122b, the panel openings 114a, 114b are preferably aligned in a substantially in-line pattern 117 (see FIG. 6).

Figure 10:
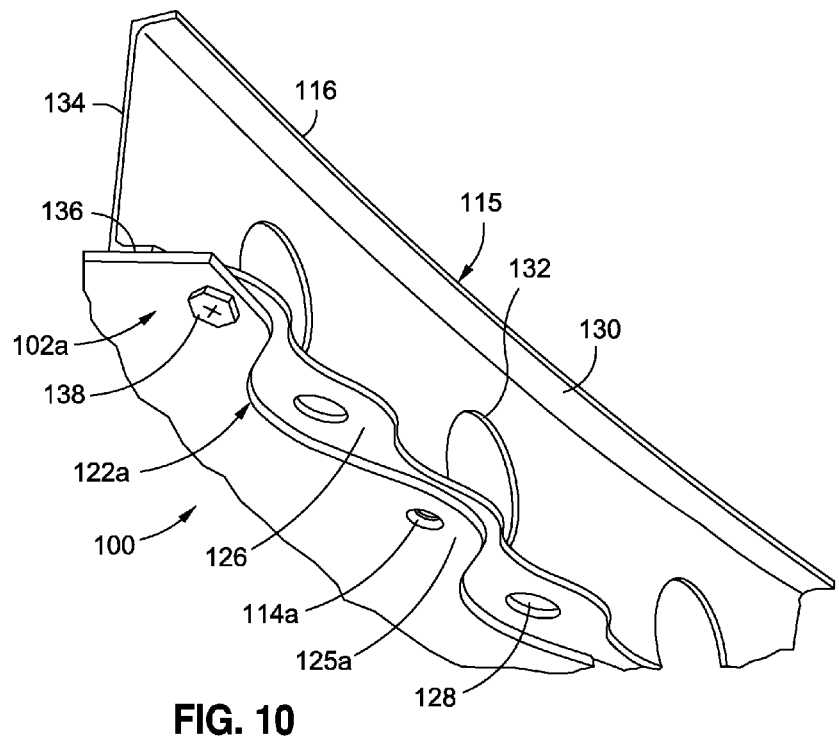
FIG. 10 is an illustration of a close-up perspective view of an exterior portion of one of the panel elements of FIG. 9A attached to a structural frame element.

As shown in FIGS. 9A-9B and FIG. 10, the first and second panel elements 102a, 102b may be joined to the structure 115, such as the structural frame element 116. The structure 115, such as the structural frame element 116, may comprise a first end edge 126 (see FIG. 10) having a C-profile 112 (see FIG. 9A) and having a plurality of frame openings 128. The structure 115, such as the structural frame element 116, may further comprise a second end edge 130 and a body 134 having openings 132. Preferably, the frame openings 128 correspond to the panel openings 114a, 1144b of the panel elements 102a, 102b.

The panel assembly 100 may further comprise a plurality of fastener elements 138 (see FIGS. 9C, 10). The fastener elements 138 may comprise known fastener elements such as rivets, nuts and bolts, screws, or other suitable fastener elements. Each fastener element 138 is configured for insertion through the panel opening 114a, 114b (see FIGS. 9C, 10), respectively, of the first and second panel elements 102a,

102b. Each fastener element 138 is configured for further insertion through a corresponding frame opening 128 (see FIG. 10) provided in the first end edge 126 of the structure 115, such as the structural frame element 116. FIG. 10 is an illustration of a close-up perspective view of an exterior portion of the first panel element 102a of FIG. 9A attached to the first end edge 126 of the structure 115, such as the structural frame element 116, at attachment interface 136a. The first and second panel elements 102a, 102b are joined to the structure 115, such as the structural frame element 116, via fastener elements 138 (see FIGS. 9C, 10) inserted through the panel openings 114a, 114b and the corresponding frame openings 128. As shown in FIG. 9C, when the edgebands 108a, 108b of the first and second panel elements 102a, 102b, respectively, are interlaced together, the fastener elements 138 may be inserted through panel openings 114a, 114b and through frame openings 128 to join or attach the first and second panel elements 102a, 102b to the structure 115, such as the structural frame element 116, and, in turn, to join or attach the first and second panel elements 102a, 102b, to each other. Alternatively, instead of fastener elements 138, the panel assembly 100 may be joined to the structure 115 via an adhesive or other chemical bonding element or other suitable fastening mechanism.

FIG. 7 is an illustration of an exploded perspective view of one of the embodiments of the panel assembly 100 of the disclosure attached to the structure 115, such as the structural frame element 116. As shown in FIG. 7, the second panel element 102b is shown separated from the first panel element 102a which is shown attached to the structure 115, such as the structural frame element 116. FIG. 8 is an illustration of a cross-sectional view of the structural frame element 116 attached at attachment interfaces 136a, 136b to the edgebands 108a, 108b, respectively, of the first and second panel elements 102a, 102b, respectively. As shown in FIG. 8, the edgeband 108a of the first panel element 102a is attached to the first end edge 126 of the structure 115, such as the structural frame element 116, at attachment interface 136a, and the edgeband 108b of the second panel element 102b is attached to the first end edge 126 of the structure 115, such as the structural frame element 116, at attachment interface 136b.

Figure 4:
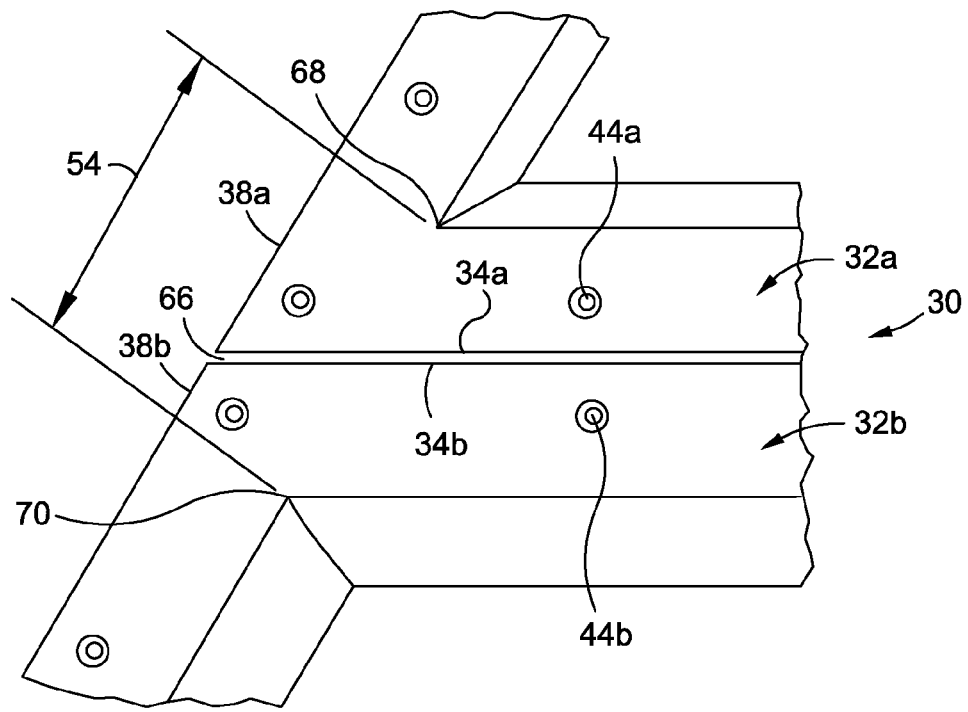
FIG. 4 is an illustration of an interior perspective view of an interface of panel elements of the known aircraft wing-to-body fairing panel assembly of FIG. 2A.

The panel assembly 100 disclosed herein preferably has an overall reduced fastener element count of fastener elements 138 that may be used to fasten the interlaced panel edgebands 108a, 108b of the first and second panel elements 102a, 102b to the structure 115 as compared to an overall fastener element count that may be used to fasten adjacent panel edgebands 38a, 38b (see FIG. 4) formed by adjacent panel elements 32a, 32b having linear edges 34a, 34b (see FIG. 4). The reduced fastener element count of the panel assembly 100 preferably results in a further overall reduced weight of the panel assembly 100 and the structure 115 to which the panel assembly 200 is joined.

Figure 5:
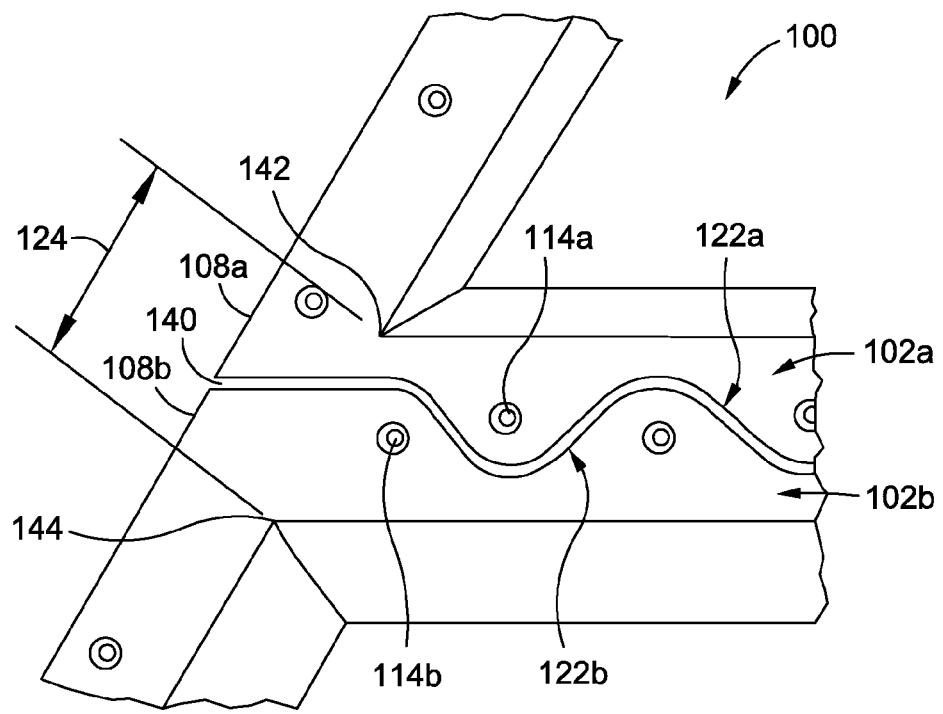
FIG. 5 is an illustration of an interior perspective view of an interface of panel elements of one of the embodiments of a panel assembly of the disclosure.

FIG. 5 is an illustration of an interior perspective view of an interface 140 formed between the first panel nonlinear edge 122a and the second panel nonlinear edge 122b of the first panel element 102a, and the second panel element 102b, respectively. The second panel nonlinear edge 122b is designed to interlace with the first panel nonlinear edge 122a to form the panel assembly 100 with edgebands 108a, 108b that are interlaced for joining to the structure 115 (see FIG. 9A). FIG. 5 shows the edgebands 108a, 108b interlaced together to form the edgeband width 124 which may comprise a solid laminate interface area when the first and second panel elements 102a, 102b are comprised of composite material. The edgeband width 124 is formed between an end 142 of the edgeband 108a and an end 144 of the edgeband 108b.

The edgeband width 124 of the panel edgebands 108a, 108b that are interlaced together is preferably reduced as compared to an edgeband width 54 (see FIG. 4) of known adjacent edgebands 38a, 38b (see FIG. 4) formed by known adjacent panel elements 32a, 32b (see FIG. 4) having linear edges 34a, 34b (see FIG. 4). The reduced edgeband width 124 preferably results in an overall reduced weight of the panel assembly 100, and when joined or attached to the structure 115 (see FIG. 9A), preferably results in an overall reduced weight of the joined or attached panel assembly 100 and structure 115.

FIG. 6 is an illustration of an exterior view of one of the embodiments of the panel assembly 100 of the disclosure showing an interlaced panel edgeband profile 119 formed between the first panel nonlinear edge 122a and the second panel nonlinear edge 122b of the first panel element 102a, and the second panel element 102b, respectively. FIG. 6 further shows the substantially in-line pattern 117 of the panel openings 114a, 114b when the first panel nonlinear edge 122a is interlaced and joined with the second panel nonlinear edge 122b.

Figure 11A:
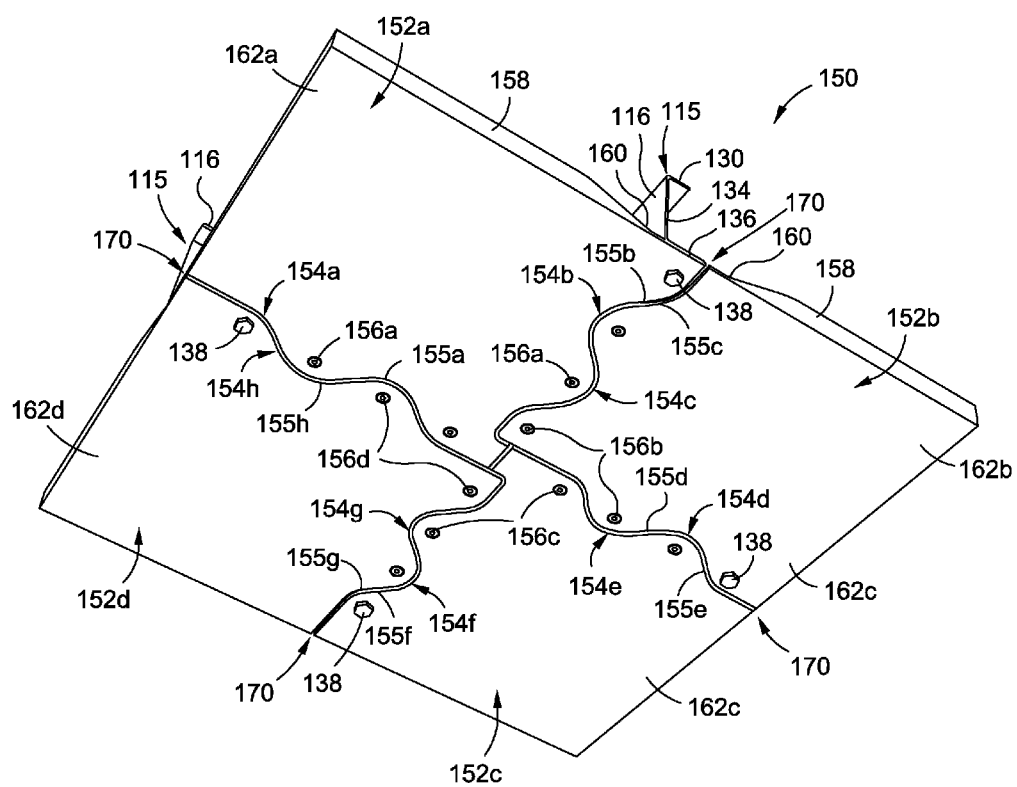
FIG. 11A is an illustration of an exterior perspective view of another embodiment of a panel assembly of the disclosure showing four interlaced panel elements.
Figure 11B:
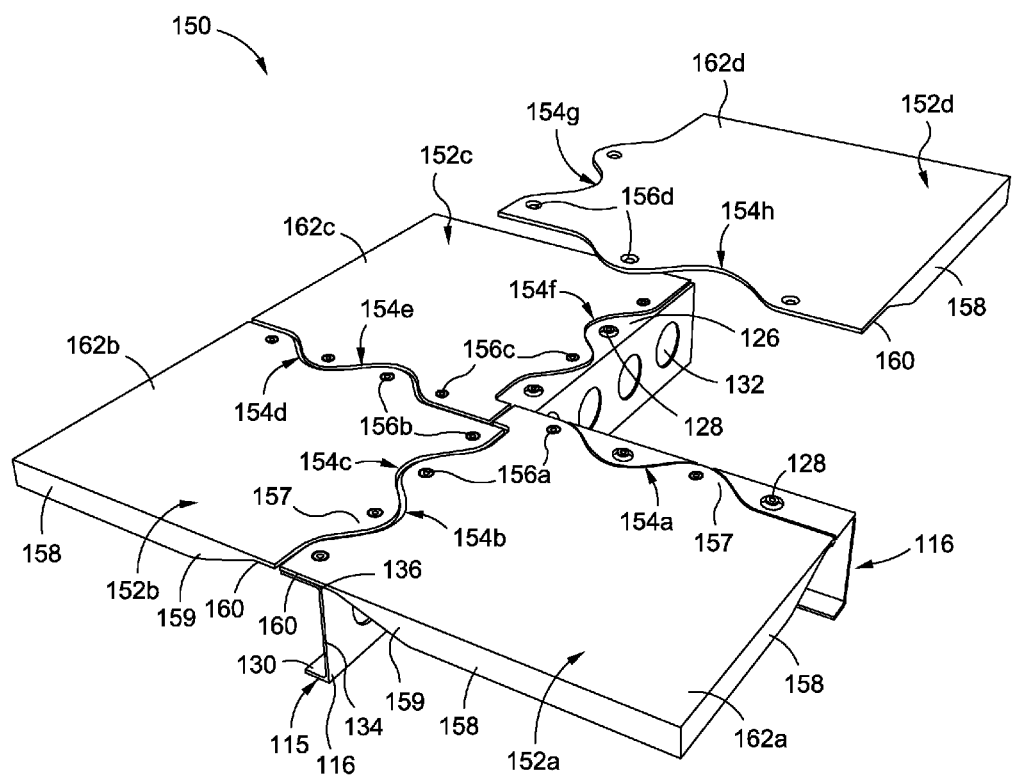
FIG. 11B is an illustration of an exterior perspective view of the panel assembly of FIG. 11A with one panel element disconnected.
Figure 11C:
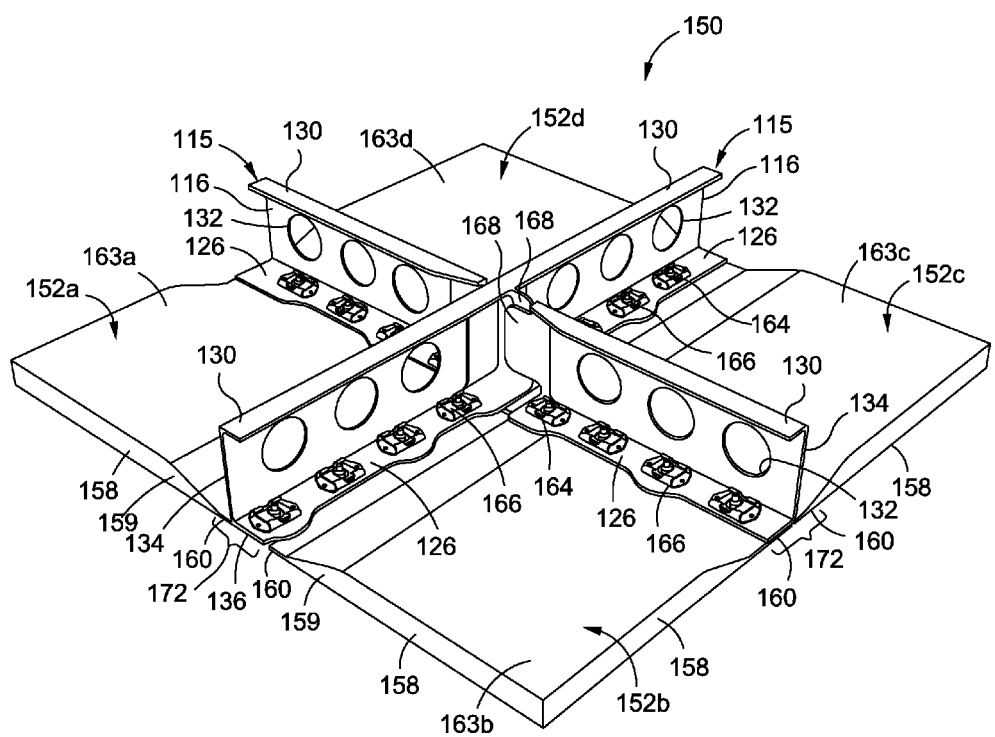
FIG. 11C is an illustration of an interior perspective view of the panel assembly of FIG. 11A.

As shown in FIGS. 11A-11C, in another embodiment of the disclosure, there is provided a scalloped panel assembly 150 comprising four panel elements 152a, 152b, 152c, 152d each having at least one nonlinear edge 154a-154h. As shown in FIG. 11A, panel element 152a comprises nonlinear edge 154a and nonlinear edge 154b. Panel element 152b comprises nonlinear edge 154c and nonlinear edge 154d. Panel element 152c comprises nonlinear edge 154e and nonlinear edge 154f. Panel element 152d comprises nonlinear edge 154g and nonlinear edge 154h. Preferably, the nonlinear edges 154a-154h each have a scalloped or zippered edge configuration 155a, 155b, 155c, 155d, 155e, 155f, 155g, 155h, respectively.

FIG. 11A is an illustration of an exterior perspective view of the scalloped panel assembly 150 showing the four panel elements 152a, 152b, 152c, 152d that are interlaced together. As shown in FIG. 11A, nonlinear edge 154a is interlaced with nonlinear edge 154h, nonlinear edge 154b is interlaced with nonlinear edge 154c, nonlinear edge 154d is interlaced with nonlinear edge 154e, and nonlinear edge 154f is interlaced with nonlinear edge 154g. The four panel elements 152a-152d interlace together at interfaces 170 (see FIG. 11A). When the nonlinear edges 154a-154h are interlaced and panel elements 152a-152d are adjacent each other, the edgebands 160 of adjacent panel elements 152a-152d form an edgeband width 172 (see FIG. 11C).

Each panel element 152a-152d further comprises a plurality of panel openings 156a, 156b, 156c, 156d, respectively, that are configured to receive fastener elements 138 (see FIG. 11A). As discussed above, the fastener elements 138 may comprise known fastener elements such as rivets, nuts and bolts, screws, or other suitable fastener elements. Alternatively, instead of fastener elements 138, the panel assembly 100 may be joined to the structure 115 via an adhesive or other chemical bonding element or other suitable fastening mechanism. Each panel element 152a-152d further comprises core portions 158 having ramped portions 159 (see FIG. 11B) and edgebands 160. Each panel element 152a-152d further comprises exterior surfaces 162a, 162b, 162c, and 162d (see FIGS. 11A-11B) and interior surfaces 163a, 163b, 163c, and 163d (see FIG. 11C).

As shown in FIG. 11A, the scalloped panel assembly 150 is preferably joined or attached to structure 115 at attachment interface 136. As shown in FIGS. 11A-11B, the structure 115 may comprise one or more structural frame elements 116, each comprising a first end edge 126, a second end edge 130, and a body 134 having openings 132.

FIG. 11B is an illustration of an exterior perspective view of the exterior surfaces 162a-162d of the scalloped panel assembly 150 of FIG. 11A with one panel element 152d disconnected from the other panel elements 152a, 152b, 152c. The structure 115 comprising structural frame elements 116 is shown. Each structural frame element 116 comprises first end edge 126, second end edge 130, and body 134 having openings 132.

FIG. 11C is an illustration of an interior perspective view of the interior surfaces 163a-163d of the scalloped panel assembly 150 of FIG. 11A. As shown in FIG. 11C, the scalloped panel assembly 150 is preferably joined or attached to structure 115 at attachment interface 136. As shown in FIG. 11C, the structure 115 comprises multiple structural frame elements 116. The structural frame elements 116 may be attached to the edgebands 160 of the panel elements 152a-152d via a plurality of fastener elements 138 (see FIG. 11A). The fastener elements 138 may be secured with attachment elements 164. Preferably, the attachment elements 164 comprise fittings 166 configured to anchor and hold the fastener elements 138 in place against the first end edge 126 of the structural frame element 116. As further shown in FIG. 11C, one or more structural frame elements 116 may be continuous or undivided along the edgebands 160 of the panel elements. Alternatively, as shown in FIG. 11C, one or more structural frame elements 116 may be divided or split into two or more frame element pieces 168 that may attach on each side of the continuous structural frame element 116.

In other embodiments, the panel assembly may comprise more than four panel elements where each panel element may have one or more nonlinear edge that is configured to interlace and join together with a nonlinear edge of adjacent panel elements.

Figure 12:
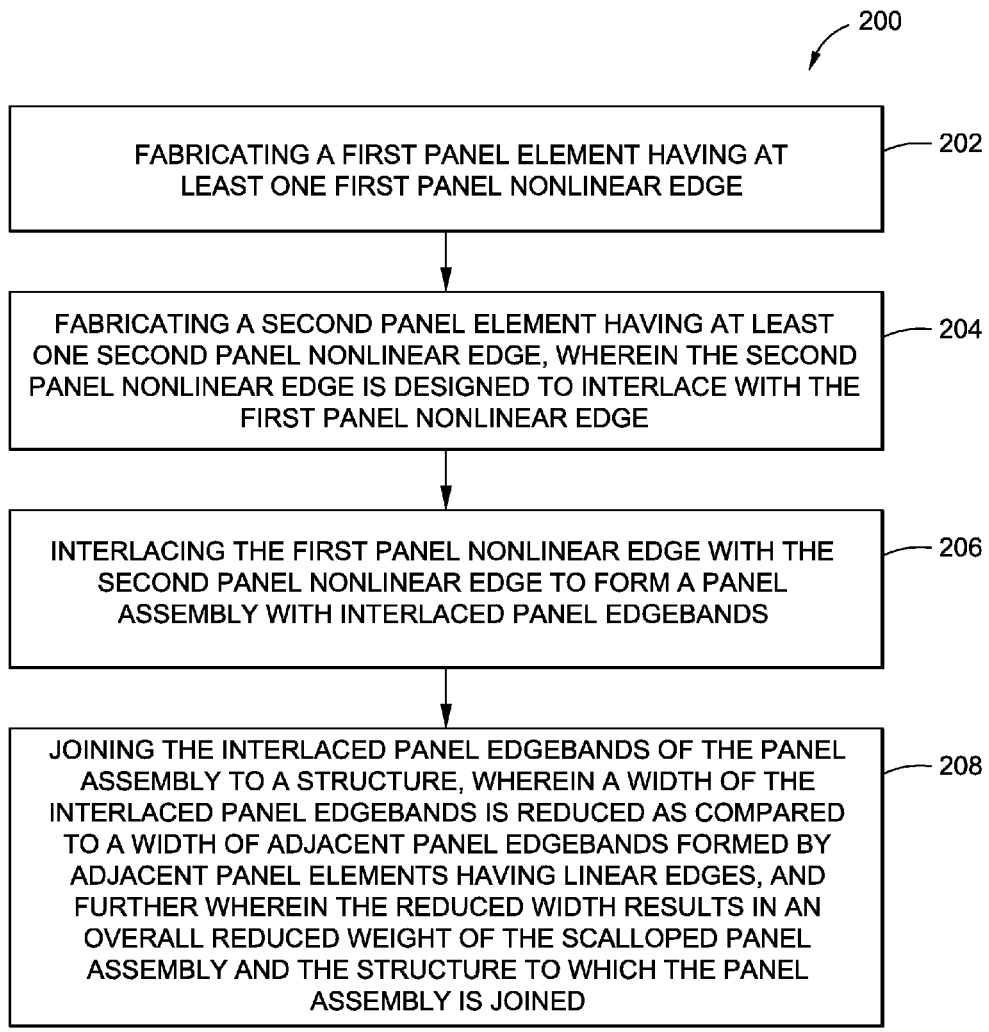
FIG. 12 is an illustration of a flow diagram of an exemplary embodiment of a method of the disclosure.

In another embodiment of the disclosure, there is provided a method 200 of making a panel assembly 100 (see FIG. 9A) for joining to a structure 115 (see FIG. 9A), such as a structural frame element 116 (see FIG. 9A). The structural frame element 116 may comprise an aircraft structural frame element 46 (see FIG. 2A). FIG. 12 is an illustration of a flow diagram of an exemplary embodiment of the method 200 of the disclosure. The structure 115 preferably has at least one panelized construction portion 101 (see FIG. 1) and may comprise an aircraft 10 (see FIG. 1), a spacecraft, a satellite, a rotorcraft, a watercraft, a boat, a train, an automobile, a truck, a bus, a tractor trailer, a building, and an architectural structure, or another suitable structure.

As shown in FIG. 12, the method 200 comprises step 202 of fabricating a first panel element 102a (see FIG. 9A) having at least one first panel nonlinear edge 122a (see FIG. 9C). The method 200 further comprises step 204 of fabricating a second panel element 102b having at least one second panel nonlinear edge 122b. The second panel nonlinear edge 122b is preferably designed to interlace with the first panel nonlinear edge 122a. The first and second panel elements 102a, 102b are fabricated using panel fabrication processes known in the art.

As shown in FIG. 12, the method 200 further comprises step 206 of interlacing the first panel nonlinear edge 122a with the second panel nonlinear edge 122b to form a panel assembly 100 (see FIG. 9C) with interlaced panel edgebands 108a, 108b (see FIG. 6).

As shown in FIG. 12, the method 200 further comprises step 208 of joining the interlaced panel edgebands 108a, 108b of the panel assembly 100 to a structure 115, such as a structural frame element 116 (see FIG. 9B). An edgeband width 124 (see FIG. 5) of the interlaced panel edgebands 108a, 108b is preferably reduced as compared to a width 54 (see FIG. 4) of adjacent panel edgebands 38a, 38b (see FIG. 4) formed by adjacent panel elements 32a, 32b having linear edges 34a, 34b. The reduced edgeband width 124 preferably results in an overall reduced weight of the panel assembly 100, and when the panel assembly 110 is attached to the structure 115, preferably results in an overall reduced weight of the panel assembly 100 and the structure 115.

The method 200 may further comprise fastening the interlaced panel edgebands 108a, 108b to the structure 115 with a plurality of fastener elements 138. The panel assembly 100 disclosed herein preferably has an overall reduced fastener element count of fastener elements 138 that may be used to fasten the interlaced panel edgebands 108a, 108b of the first and second panel elements 102a, 102b to the structure 115, such as the structural frame element 116, as compared to an overall fastener element count that may be used to fasten adjacent panel edgebands 38a, 38b (see FIG. 4) formed by adjacent panel elements 32a, 32b having linear edges 34a, 34b (see FIG. 4). The reduced fastener element count of the panel assembly 100 preferably results in a further overall reduced weight of the panel assembly 100 and the structure 115. Alternatively, instead of fastener elements 138, the panel assembly 100 may be joined to the structure 115 via an adhesive or other chemical bonding element or other suitable fastening mechanism.

Figure 13:
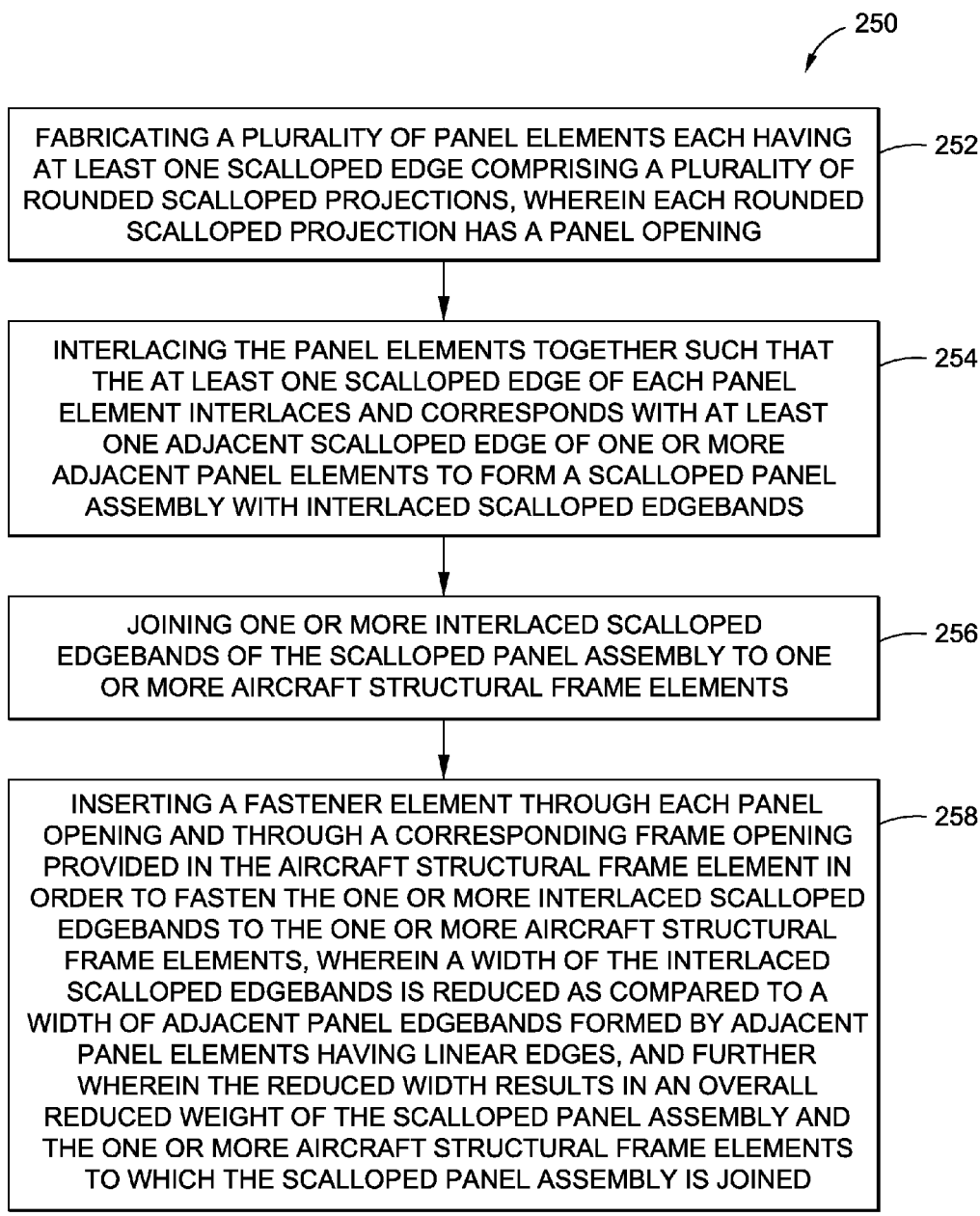
FIG. 13 is an illustration of a flow diagram of another exemplary embodiment of a method of the disclosure.

In another embodiment of the disclosure, there is provided a method 250 of making a scalloped panel assembly 150 (see FIGS. 11A-11B) for joining to an aircraft 10 (see FIG. 1). FIG. 13 is an illustration of a flow diagram of an exemplary embodiment of the method 300 of the disclosure. The method 250 comprises step 252 of fabricating a plurality of panel elements 152a-152d (see FIG. 11A), each panel element 152a-152d having at least one nonlinear edge 154a-154h (see FIG. 11A). Preferably, the nonlinear edges 154a-154h each comprise scalloped or zippered edges 155a-155h (see FIG. 11A), respectively, each comprising a plurality of rounded scalloped projections 157. Each rounded scalloped projection 157 preferably has a plurality of fastener openings 156a-156d (see FIG. 11B). The panel element 152a-152d are fabricated using panel fabrication processes known in the art.

The method 250 further comprises step 254 of interlacing the panel elements 152a-152d together such that at least one scalloped or zippered edge 155a-155h of the panel elements 152a-152d interlace and correspond with at least one adjacent scalloped or zippered edge 155a-155h of one or more adjacent panel elements 152a-152d to form a scalloped panel assembly 150 with interlaced scalloped edgebands 160 (see FIG. 11B).

Figure 2B:
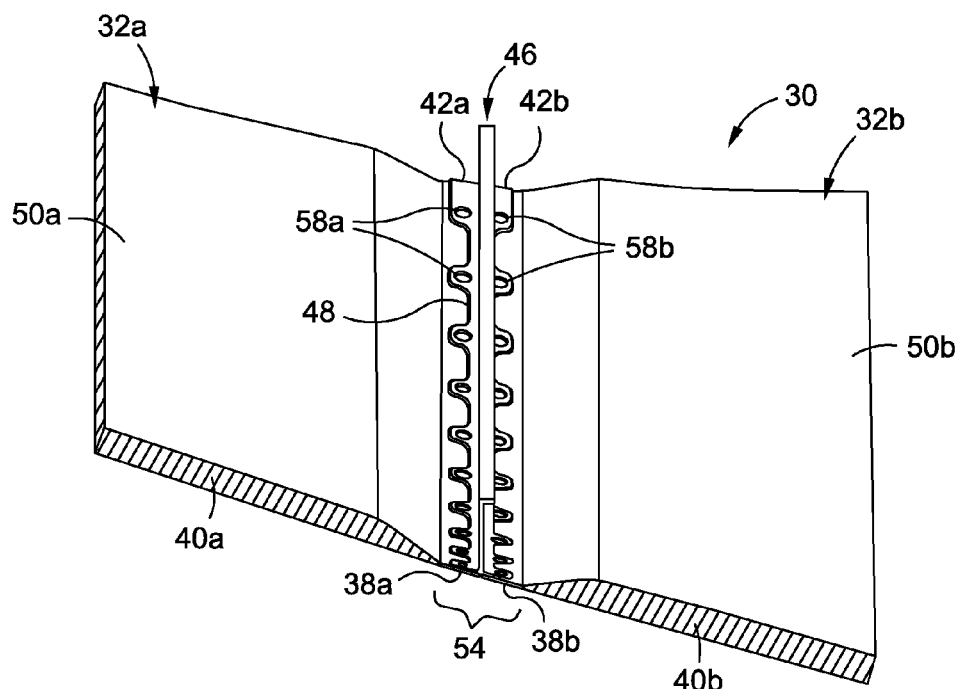
FIG. 2B is an illustration of an interior front perspective view of the known aircraft wing-to-body fairing panel assembly of FIG. 2A.
Figure 2C:
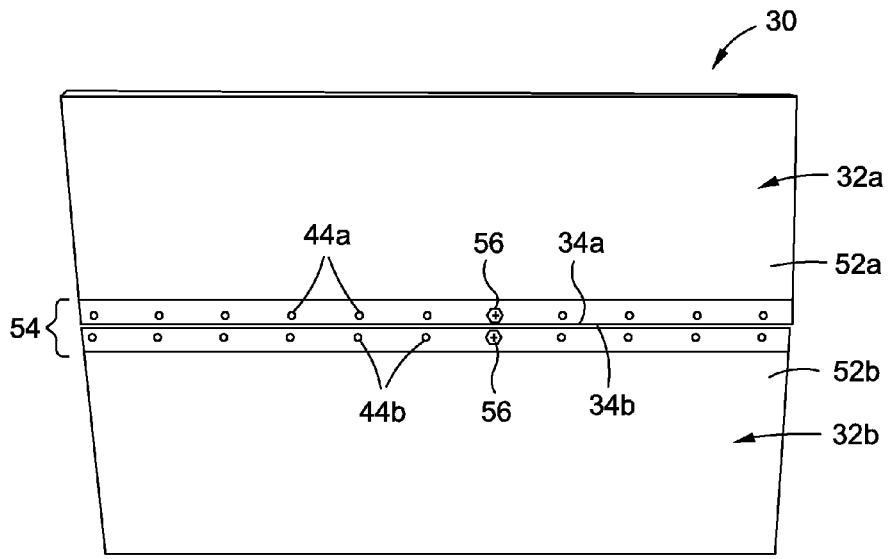
FIG. 2C is an illustration of an exterior perspective view of the known aircraft wing-to-body fairing panel assembly of FIG. 2A.
Figure 3:
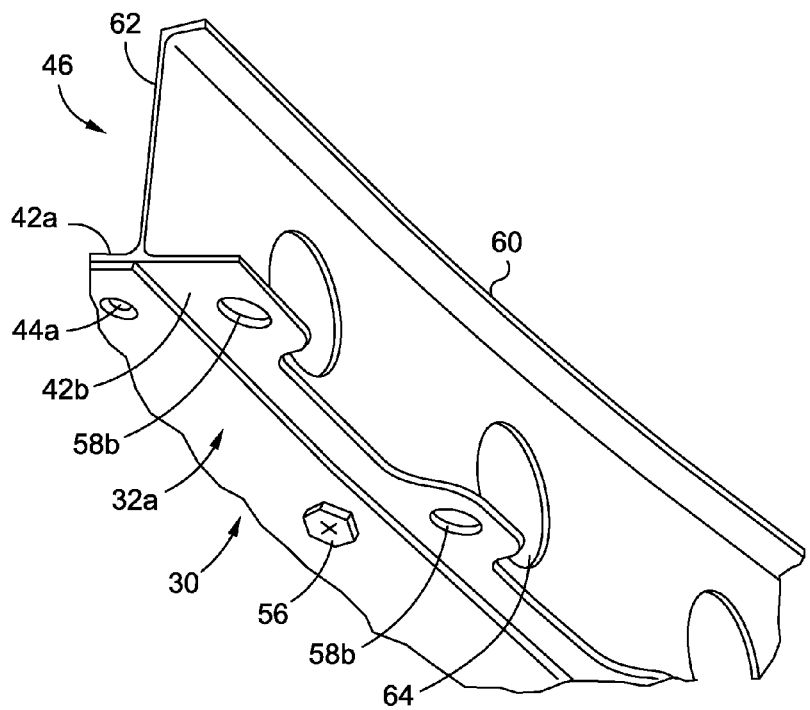
FIG. 3 is an illustration of a close-up perspective view of an exterior portion of one of the known panel elements of FIG. 2A attached to an aircraft structural frame element.

The method 250 further comprises step 256 of joining one or more interlaced scalloped edgebands 160 of the scalloped panel assembly 150 to one or more structures 115, such as structural frame elements 116 (see FIG. 11B), where the structural frame elements 116 preferably comprise aircraft structural frame elements 46 (see FIG. 2B).

The method 250 further comprises step 258 of inserting a fastener element 138 (see FIG. 11A) through each panel opening 156a-156d (see FIG. 11A) and through corresponding frame openings 128, such as, for example, aircraft frame openings, provided in structural frame element 116, such as the aircraft structural frame element 46 (see FIG. 2B) in order to fasten the one or more interlaced scalloped edgebands 160 to the one or more structural frame elements 116, such as aircraft structural frame elements 46. Alternatively, instead of fastener elements 138, the scalloped panel assembly 100 may be joined to the structure 115 via an adhesive or other chemical bonding element or other suitable fastening mechanism.

An edgeband width 172 (see FIG. 11B) of the interlaced scalloped edgebands 160 is preferably reduced as compared to an edgeband width 54 (see FIG. 4) of adjacent panel edgebands 38a, 38b (see FIG. 4) formed by adjacent panel elements 32a, 32b (see FIG. 4) having linear edges 34a, 34b (see FIG. 4). The reduced edgeband width 172 preferably results in an overall reduced weight of the panel assembly 100 and the structure 115, such as the structural frame element 116, preferably comprising one or more aircraft structural frame elements 46.

When the panel scalloped edges are interlaced and joined with the structural frame element 116, preferably comprising one or more aircraft structural frame elements 46, the panel openings 156a-156d in the rounded scalloped projections 157 are preferably aligned in a substantially in-line pattern 117 (see FIG. 6). The scalloped panel assembly 150 preferably has a reduced fastener element count to fasten the one or more interlaced scalloped edgebands 160 to the one or more structural frame elements 116, such as the aircraft structural frame elements 46, as compared to a fastener element count to fasten adjacent panel edgebands 38a, 38b (see FIG. 4) formed by adjacent panel elements 32a, 32b (see FIG. 4) having linear edges 34a, 34b (see FIG. 4). The reduced fastener element count preferably results in a further overall reduced weight of the scalloped panel assembly 150 and the structure 115, such as the structural frame element 116, preferably comprising one or more aircraft structural frame elements 46.

Disclosed embodiments of the panel assemblies 100, 150 and methods 200, 300 provide first and second panel elements 102a, 102b (see FIG. 9A) or panel elements 152a-152d (see FIG. 11A) having edgebands 108a, 108b (see FIG. 9B) or edgebands 160 (see FIG. 11B), respectively, having a scalloped or zippered edge configuration 123a, 123b (see FIG. 9C) or 155a-155h (see FIG. 11A), respectively. Preferably, the panel assemblies 100, 150 may be used in structures having at least one panelized construction portion 101 (see FIG. 1). More preferably, the panel assemblies 100, 150 may be used for wing-to-body fairings 26 (see FIG. 1) on aircraft 10 (see FIG. 1). By scalloping and interlacing the edgebands 108a, 108b (see FIG. 9B) or edgebands 160 (see FIG. 11B) of the first and second panel elements 102a, 102b (see FIG. 9A) or panel elements 152a-152d (see FIG. 11A), respectively, a weight savings for both the panel assemblies and the joined or attached structure may be achieved over known wing-to-body fairing panel configurations having panel elements with linear or straight edges. Further, by using the scalloped or zippered edge configuration 123a, 123b (see FIG. 9C) or 155a-155h (see FIG. 11A), the size of the edgebands 108a, 108b (see FIG. 9B) or edgebands 160 (see FIG. 11B), as well as the thickness of the joint formed between the panel elements, may be reduced, and may thus result in an overall decrease in a solid laminate edgeband area and may also result in an overall reduction in weight of the panel assemblies and the attached structure. The use of first and second panel elements 102a, 102b (see FIG. 9A) or panel elements 152a-152d (see FIG. 11A) having edgebands 108a, 108b (see FIG. 9B) or edgebands 160 (see FIG. 11B), respectively, having a scalloped or zippered edge configuration 123a, 123b (see FIG. 9C) or 155a-155h (see FIG. 11A), respectively, may result in lighter weight panel assemblies and joined or attached structures, for example, lighter weight wing-to-body fairings and lighter weight aircraft. A weight savings may be achieved due to an overall reduction in the solid laminate edgeband area and a corresponding increase in the core portion area or sandwich region or portion of the panel element with a honeycomb core, since the core portion area or sandwich region or portion of the panel element with a honeycomb core weighs less than the solid laminate edgeband area.

Figure 14:
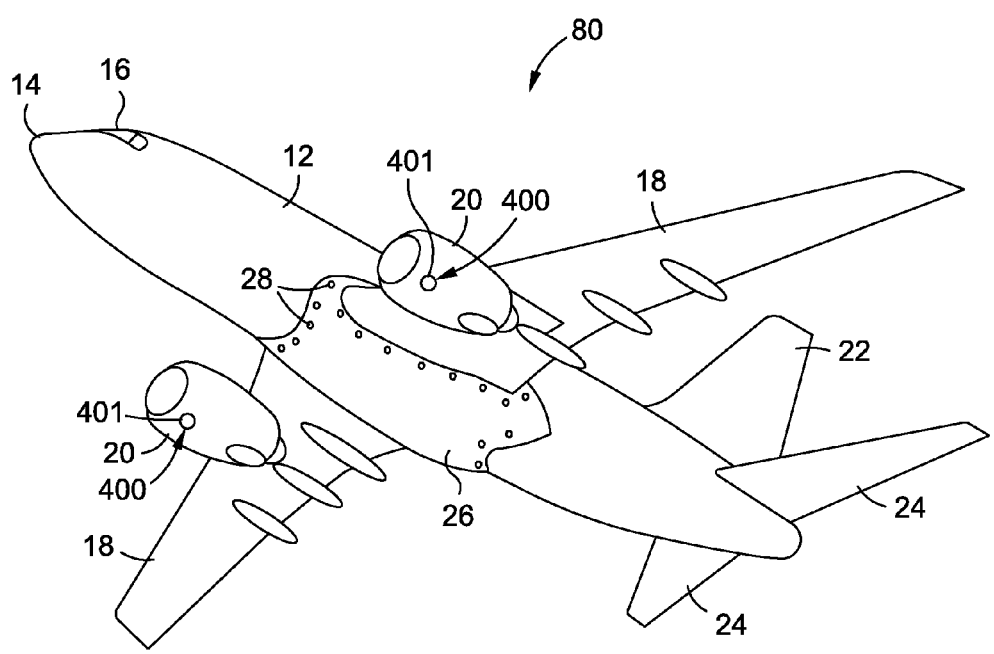
FIG. 14 is an illustration of a perspective view of an exemplary aircraft that may incorporate one or more advantageous embodiments of an access door assembly of the disclosure.
Figure 18:
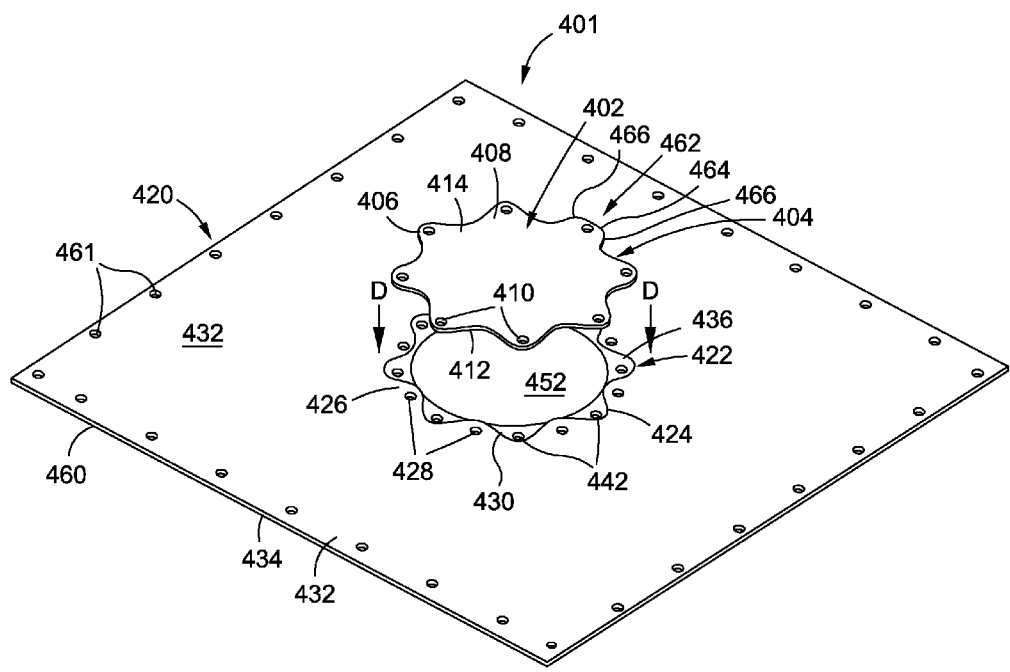
FIG. 18 is an illustration of an exterior perspective view of another one of the embodiments of an access door assembly of the disclosure where the access door has a positioning tab portion; and, FIG. 19 is an illustration of a flow diagram of an exemplary embodiment of a method of making one of the embodiments of an access door assembly of the disclosure.

FIG. 14 is an illustration of a perspective view of an exemplary aircraft 80 that may incorporate one or more advantageous embodiments of an access door assembly 400 (see FIGS. 16A-16D) of the disclosure that may be in the form of an aircraft access door assembly 401 (see FIG. 18). As shown in FIG. 14, the aircraft 10 comprises a fuselage or body 12, a nose 14, a cockpit 16, wings 18 operatively coupled to the fuselage or body 12, one or more propulsion units 20, a tail vertical stabilizer 22, one or more tail horizontal stabilizers 24, and a wing-to-body fairing 26 with fasteners 28. FIG. 14 shows access door assemblies 400, such as aircraft access door assemblies 401, incorporated on the propulsion units 20. Although the aircraft 10 shown in FIG. 14 is generally representative of a commercial passenger aircraft, the access door assembly 400, such as the aircraft access door assembly 401, may also be employed in other types of aircraft. More specifically, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles. It may also be appreciated that embodiments of the assemblies, methods, and systems in accordance with the disclosure may be utilized in other transport vehicles, such as boats and other watercraft, trains, automobiles, trucks, buses, or other suitable transport vehicles. It may further be appreciated that embodiments of the assemblies, methods, and systems in accordance with the disclosure may be used in various structures where an access door may be attached to a structure or structural element, such as buildings, bridges, or other suitable structures.

As shown in FIGS. 16A-16D, in one of the embodiments, there is provided an access door assembly 400 for joining to a structure 444, such as an aircraft structural element 446. The structure 444 preferably has an exterior side 448 (see FIG. 16A) and an interior side 450 (see FIG. 16C). The structure 444 may comprise an aircraft 80 (see FIG. 14), a spacecraft, a satellite, a rotorcraft, a watercraft, a boat, a train, an automobile, a truck, a bus, a tractor trailer, a building or other architectural structure, or another suitable structure. Preferably, the access door assembly 400 comprises an aircraft access door assembly 401 (see FIGS. 14 and 18).

Figure 16A:
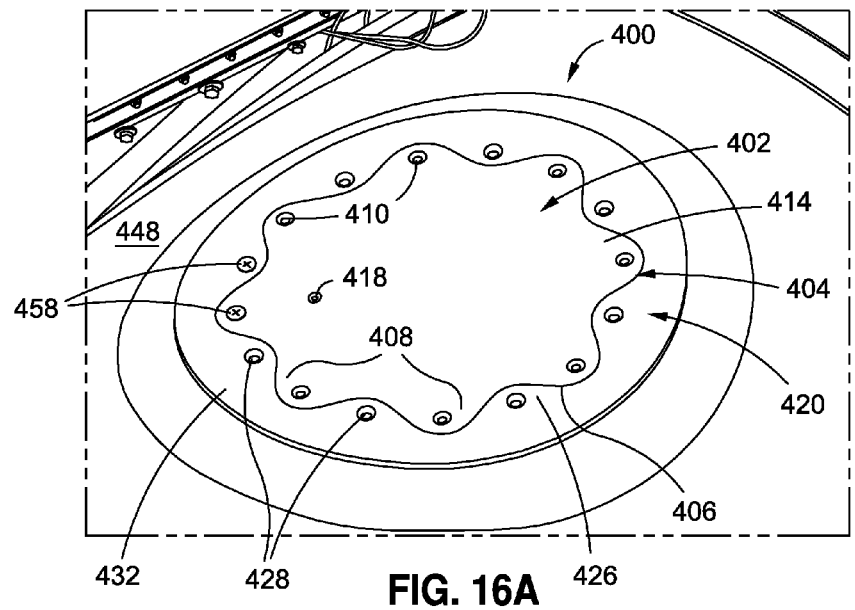
FIG. 16A is an illustration of an exterior perspective view of one of the embodiments of an access door assembly of the disclosure.
Figure 16B:
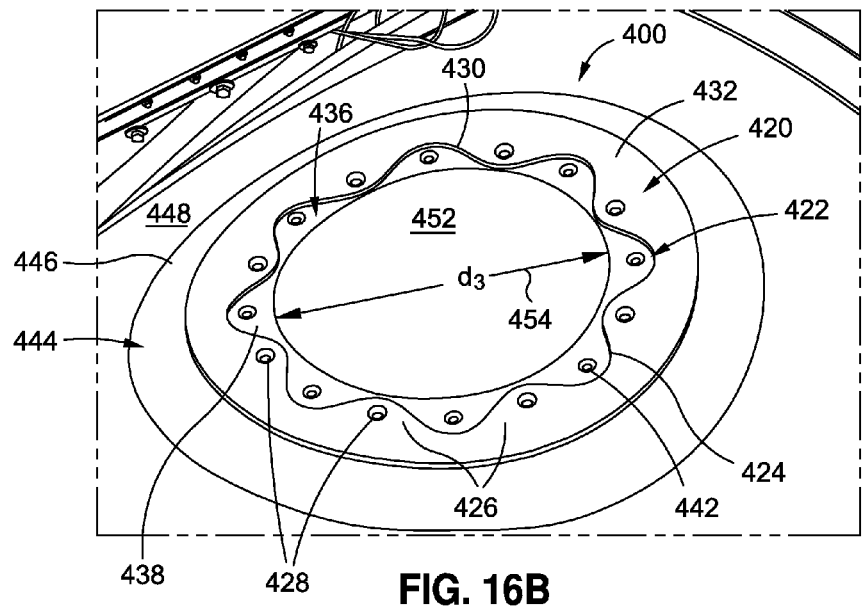
FIG. 16B is an illustration of an exterior perspective view of the access door assembly of FIG. 16A with the access door removed.
Figure 16C:
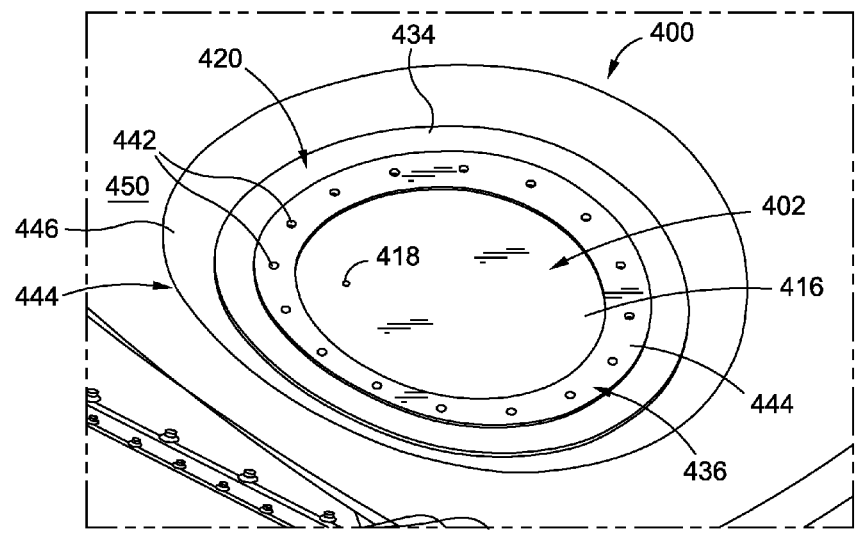
FIG. 16C is an illustration of an interior perspective view of the access door assembly of FIG. 16A.
Figure 16D:
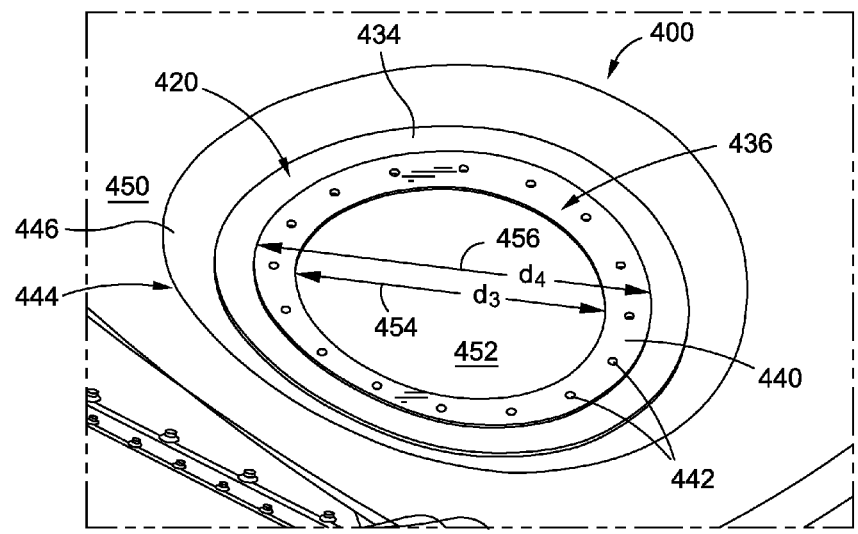
FIG. 16D is an illustration of an interior perspective view of the access door assembly of FIG. 16A with the access door removed.

FIG. 16A is an illustration of an exterior perspective view of one of the embodiments of the access door assembly 400 of the disclosure. FIG. 16B is an illustration of an exterior perspective view of the access door assembly 400 of FIG. 16A with an access door 402 removed. FIG. 16C is an illustration of an interior perspective view of the access door assembly 400 of FIG. 16A. FIG. 16D is an illustration of an interior perspective view of the access door assembly 400 of FIG. 16A with the access door 402 removed.

As shown in FIG. 16A, the access door assembly 400 comprises an access door 402 having at least one access door nonlinear edge 404. Preferably, the access door nonlinear edge 404 has a scalloped edge configuration 406 comprising a plurality of rounded scalloped projections 408 each having an access door opening 410. The access door 402 preferably comprises a plurality of the access door openings 410 (see FIG. 16A), a width 412 (see FIG. 18), an exterior side 414 (see FIG. 16A), an interior side 416 (see FIG. 16C), and a single central opening 418 (see FIG. 16A). The single central opening 418 may be used to provide access to a part or element behind the access door 402 or the structure 444, for example, access to a valve (not shown), an electrical component (not shown), a frequently replaced item, a visual indicator of a fluid level (not shown), or another part or element. Preferably, the access door openings 410 are spaced interiorly along the access door nonlinear edge 404. The access door 402 may be non-hinged and removable. Alternatively, the access door 402 may be hinged and have a hinged side or edge with the other sides having the nonlinear edges 404 or scalloped edge configuration 406. As shown in FIG. 16B, the access door 402 is removed to show an interior opening 452 into the structure 444, the interior opening 452 having a diameter ($d_3$) 454.

As shown in FIG. 16A, the access door assembly 400 further comprises a support structure 420 comprising at least one support structure nonlinear edge 422. Preferably, the support structure nonlinear edge 422 has a scalloped edge configuration 424 (see FIG. 16B) comprising a plurality of rounded scalloped projections 426 each having a support structure opening 428. The support structure 420 preferably comprises a plurality of the support structure openings 428 (see FIG. 16A), a recessed edge portion 430 (see FIG. 16B), an exterior side 432 (see FIG. 16A), and an interior side 434 (see FIG. 16C). Preferably, the support structure openings 428 are interiorly spaced along the support structure nonlinear edge 422.

Figure 15A:
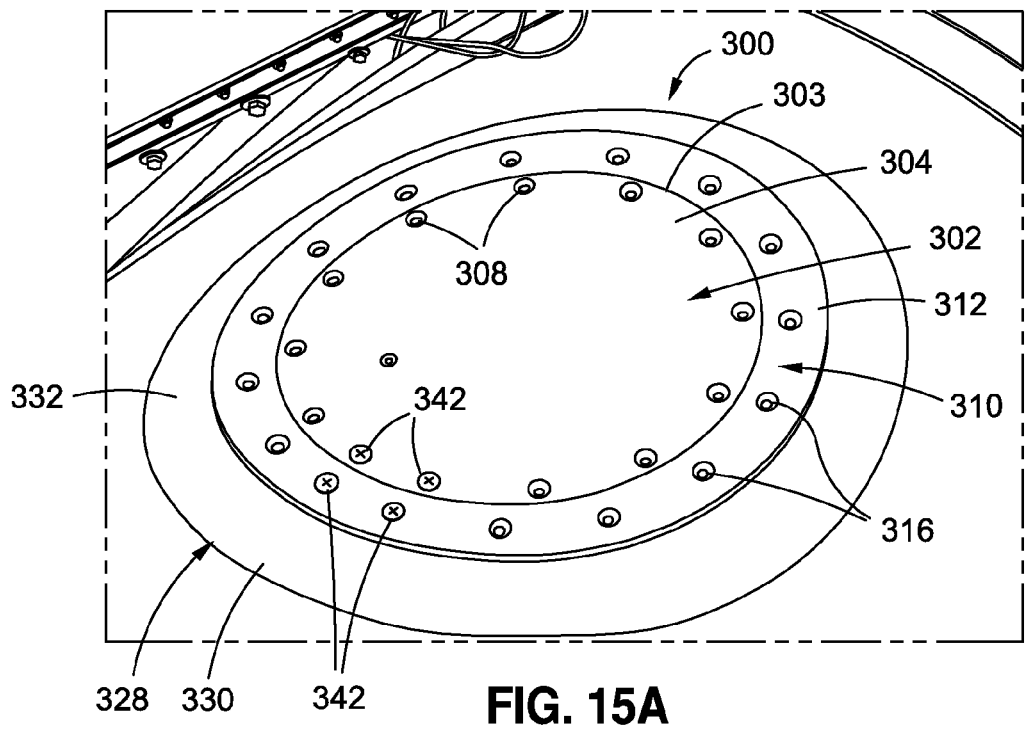
FIG. 15A is an illustration of an exterior perspective view of a known access door assembly.
Figure 15B:
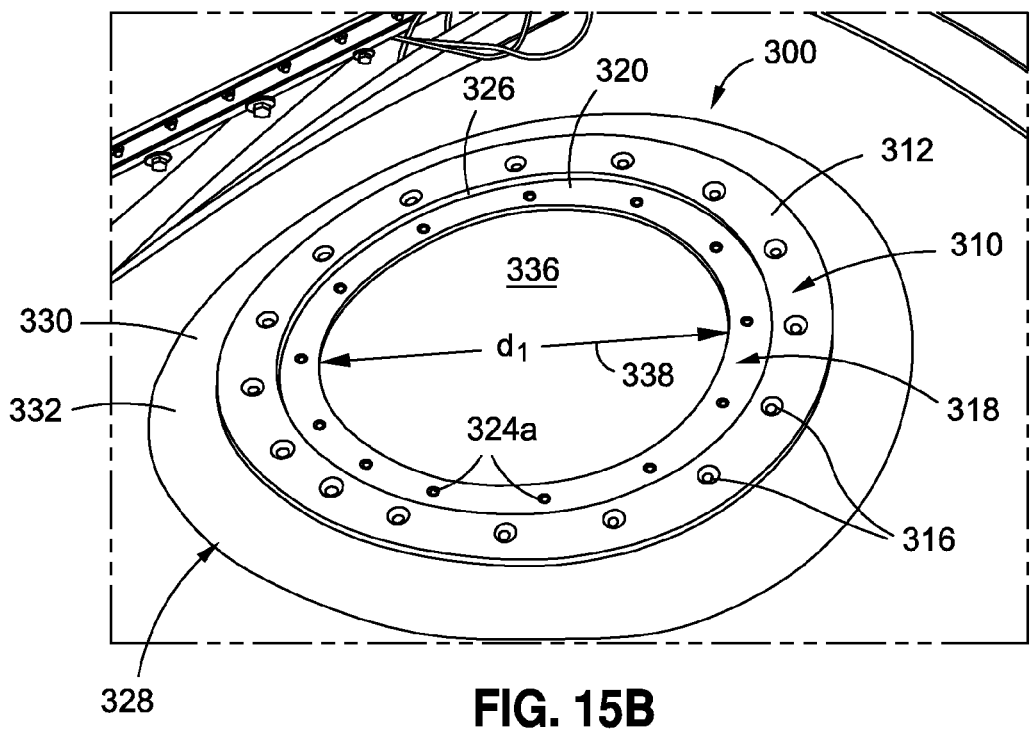
FIG. 15B is an illustration of an exterior perspective view of the known access door assembly of FIG. 15A with the access door removed.
Figure 15C:
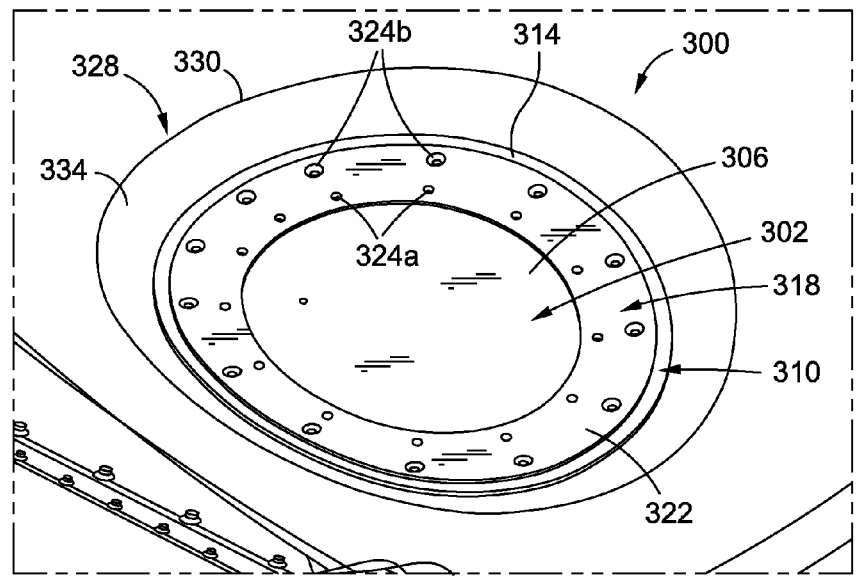
FIG. 15C is an illustration of an interior perspective view of the known access door assembly of FIG. 15A.
Figure 15D:
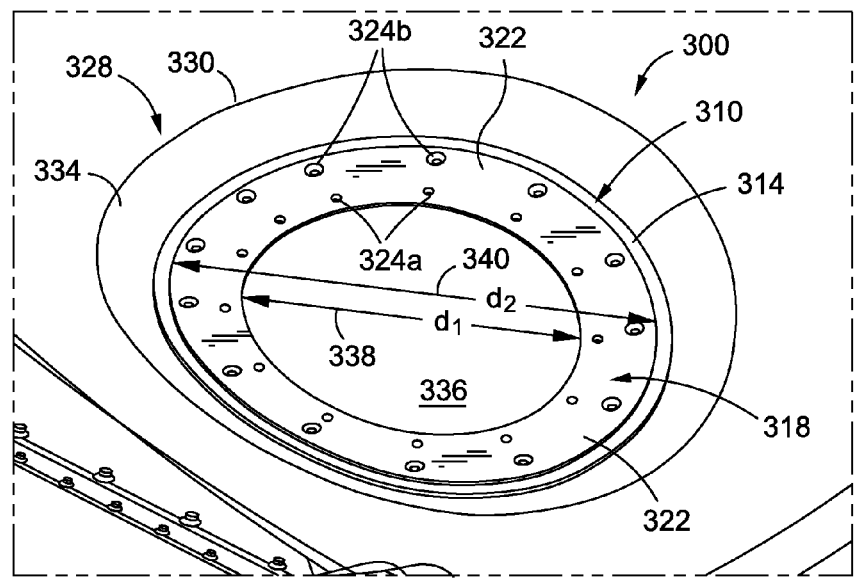
FIG. 15D is an illustration of an interior perspective view of the known access door assembly of FIG. 15A with the access door removed.

As shown in FIGS. 16B and 16D, the access door assembly 400 further comprises a doubler element 436 that may be permanently attached to the interior side 434 of the support structure 420. The doubler element 436 preferably comprises an exterior side 438 (see FIG. 16B), an interior side 440 (see FIG. 16D), and a plurality of doubler openings 442 (see FIG. 16D). As shown in FIG. 16D, the doubler element 436 has a diameter ($d_4$) 456. The diameter ($d_4$) 456 of the doubler element 436 of the access door assembly 400 is preferably reduced as compared to the diameter ($d_2$) 340 (see FIG. 15D) of the known doubler 318 (see FIG. 15D) of the known access door assembly 300 (see FIG. 15D) having the circular edge 303 (see FIG. 15A). The reduced diameter ($d_4$) 456 of the doubler element 436 preferably results in an overall reduced weight of the access door assembly 400 and the structure 444 to which the access door assembly 400 is joined.

The support structure nonlinear edge 422 is designed to interlace with the access door nonlinear edge 404 to form an access door assembly 400 for joining to the structure 444 (see FIG. 16A), such as the aircraft structural element 446 (see FIG. 16B). The access door assembly 400 preferably has an interlaced nonlinear edge interface 478 (see FIG. 17A). When the access door nonlinear edge 404 is interlaced and joined with the support structure nonlinear edge 422, the spaced access door openings 410 and the spaced support structure openings 428 are preferably aligned in a substantially continuous circle pattern 476 (see FIG. 17A). The access door nonlinear edge 404 and the support structure nonlinear edge 422 preferably each have a C-shaped profile 479 (see FIG. 17A). The access door nonlinear edge 404 and the support structure nonlinear edge 422 are preferably in a parallel position 480 (see FIG. 17A) to each other, when the access door nonlinear edge 404 and the support structure nonlinear edge 422 are interlaced together.

As shown in FIG. 16A, the access door assembly 400 may further comprise a plurality of fastener elements 458 configured for insertion through the access door openings 410 and for insertion through corresponding doubler element openings 442 (see FIG. 16B) provided in the doubler element 436 in order to attach the access door 402 to the doubler element 436 and, in turn, to the structure 444. Preferably, the access door assembly 400 has a reduced fastener element 458 count to fasten the access door 402 to the doubler element 436 and the structure 444, as compared to a fastener element 342 count to fasten the known access door assembly 300 (see FIG. 15A) having the circular edge 303 (see FIG. 15A) (or alternatively, having a linear edge). Preferably, the reduced fastener element 458 count results in an overall reduced weight of the access door assembly 400 and the structure 444 to which the access door assembly 400 is joined.

Figure 17A:
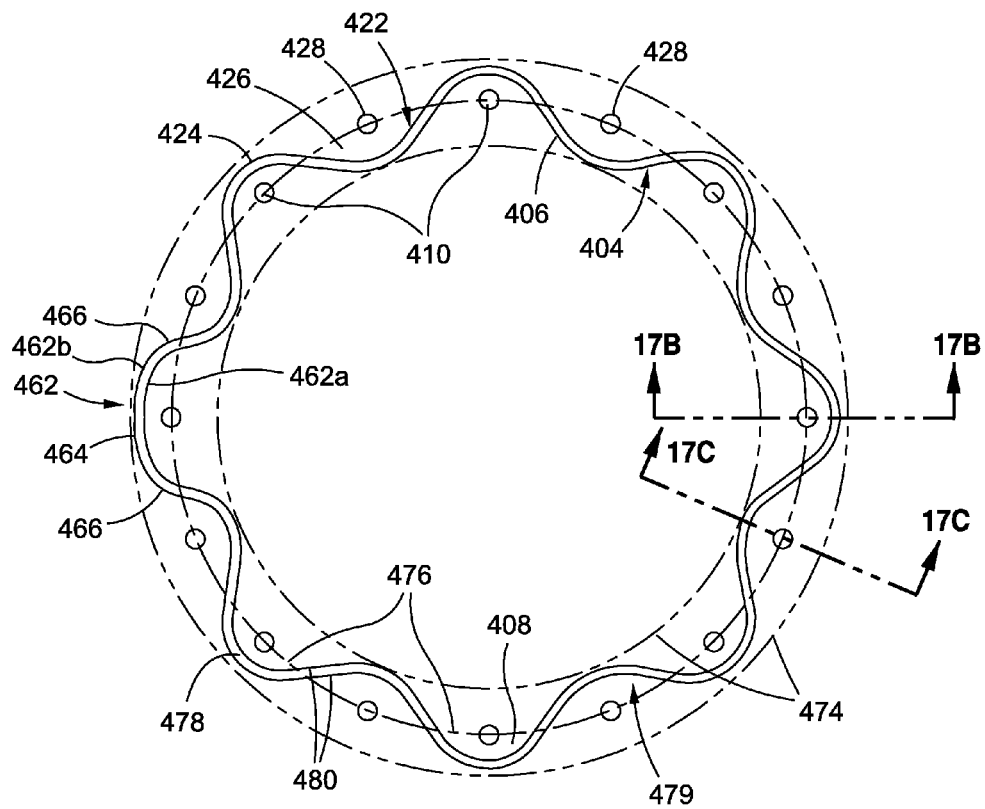
FIG. 17A is an illustration of an exterior top view of another one of the embodiments of an access door assembly of the disclosure where the access door has a positioning tab portion.

FIG. 17A is an illustration of an exterior top view of another one of the embodiments of an access door assembly 400 of the disclosure where the access door 402 has a positioning tab portion 462. The positioning tab portion 462 may be used when rotational orientation is desired or positioning or location of the access door 402 is desired. The positioning tab portion 462 is differentiated in configuration and shape from the rounded scalloped projections 408, 426 in order to ensure a particular installation alignment. As shown in FIG. 17A, the positioning tab portion 462 may comprise an top substantially flattened portion 464 and sides 466. The access door nonlinear edge 404 may have a positioning tab portion 462a. The support structure nonlinear edge 422 may have a corresponding positioning tab portion 462b. The positioning tab portion 462a of the access door nonlinear edge 404 is preferably designed to interlace with the corresponding positioning tab portion 462b of the support structure nonlinear edge 422.

Figure 17B:
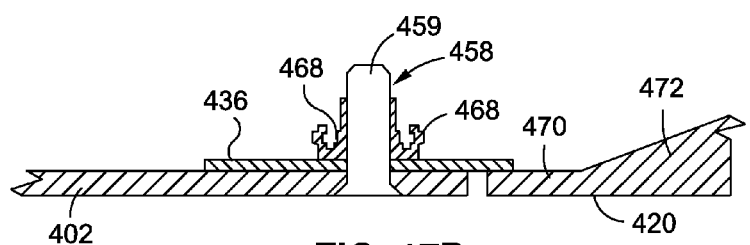
FIG. 17B is an illustration of a cross-sectional view taken along lines 17B-17B of FIG. 17A.
Figure 17C:
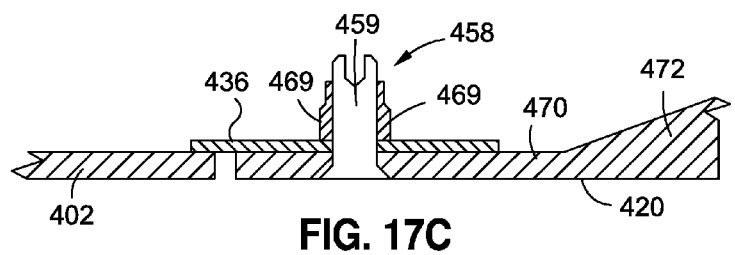
FIG. 17C is an illustration of a cross-sectional view taken along lines 17C-17C of FIG. 17A.

FIG. 17B is an illustration of a cross-sectional view taken along lines 17B-17B of FIG. 17A. FIG. 17C is an illustration of a cross-sectional view taken along lines 17C-17C of FIG. 17A. FIG. 17B shows the access door 402 attached or joined to the doubler element 436 with the fastener element 458 inserted through access door opening 410 (see FIG. 17A) and the doubler element opening 442 (see FIG. 16B). The fastener element 458 may comprise a bolt 459, a screw, a rivet, nuts and bolts, or other suitable fastener elements. Nutplates 468 are positioned adjacent the fastener element 458 to hold the fastener element 458 in place through the access door opening 410 (see FIG. 17A) the doubler element opening 442 (see FIG. 16B). As shown in FIG. 17B, the doubler element 436 is also attached to the support structure 420, and the support structure is shown with a core portion 470 and a ramped portion 472. Alternatively, instead of fastener elements 458, the access door 402 may be attached or joined to the doubler element 436 via an adhesive or other chemical bonding element or other suitable fastening mechanism.

FIG. 17C shows the core portion 470 of the support structure 420 attached or joined to the doubler element 436 inserted through the support structure opening 428 (see FIG. 17A) and the doubler element opening 442 (see FIG. 16B) with the fastener element 458. The fastener element 458 may comprise the bolt 459, a screw a rivets, nuts and bolts, or other suitable fastener elements. Nuts 469 are positioned adjacent the fastener element 458 to permanently hold the fastener element 458 in place through the support structure opening 428 (see FIG. 17A) and the doubler element opening 442 (see FIG. 16B). As shown in FIG. 17C, the access door 402 is also attached to the doubler element 436. Alternatively, instead of fastener elements 458, the support structure 420 may be attached or joined to the doubler element 436 via an adhesive or other chemical bonding element or other suitable fastening mechanism.

In another embodiment of the disclosure, there is provided an aircraft access door assembly 401 (see FIG. 14 and FIG. 18) for joining to an aircraft 80 (see FIG. 14). FIG. 18 is an illustration of an exterior perspective view of the aircraft access door assembly 401, where the access door 402 has the positioning tab portion 462 with the top flattened portion 464 and sides 466. The aircraft access door assembly 401 comprises the access door 402 preferably having the scalloped edge configuration 406 and the plurality of access door openings 410. FIG. 18 shows the access door 402 having the at least one access door nonlinear edge 404 with the scalloped edge configuration 406 comprising the plurality of rounded scalloped projections 408 each having the access door opening 410. The access door 402 may be non-hinged and removable. Alternatively, the access door 402 may be hinged and have a hinged side or edge with the other sides having the nonlinear edges 404 or scalloped edge configuration 406. As shown in FIG. 18, the access door 402 is removed to show the interior opening 452 into the support structure 420.

The aircraft access door assembly 401 further comprises the support structure 420 in the form of a support structure panel 460. The support structure panel 460 comprises at least one support structure nonlinear edge 422 with the scalloped edge configuration 424 comprising the plurality of rounded scalloped projections 426 each having the support structure opening 428. The support structure panel 460 has exterior side 432 and interior side 434. The support structure panel 460 may further comprise a plurality of edge openings 461 positioned along the exterior edges of the support structure panel 460.

The aircraft access door assembly 401 further comprises the doubler element 436 attached to an interior side 434 of the support structure 420, the doubler element having the plurality of doubler element openings 442. FIG. 18 further shows the doubler element 436 that may be permanently attached to the interior side 434 of the support structure 420 in the form of the support structure panel 460. When the access door 402 is joined to the support structure panel 460 and to the doubler element 436, the access door 402 is joined in direction D as shown in FIG. 18.

The scalloped edge configuration 406 of the access door 402 is designed to interlace with the scalloped edge configuration 424 of the support structure 420 to form the aircraft access door assembly 401 for joining to the aircraft 80 (see FIG. 14). The aircraft access door assembly 401 preferably has an interlaced scalloped interface. The aircraft access door assembly 401 further comprises a plurality of fastener elements 458 for insertion through the access door openings 410 and for insertion through the doubler element openings 442 corresponding to the access door openings 410 in order to join the access door 402 to the doubler element 436 and to the aircraft 80. A diameter ($d_4$) 456 (see FIG. 16D) of the doubler element 436 of the aircraft access door assembly 401 is preferably reduced as compared to a diameter ($d_2$) 340 (see FIG. 15D) of a doubler 318 of a known access door assembly 300 having a circular edge 303 (or alternatively, a linear edge), such that the reduced diameter ($d_4$) 456 preferably results in an overall reduced weight of the aircraft access door assembly 401 and the aircraft 80 to which the aircraft access door assembly 401 is joined.

Figure 19:
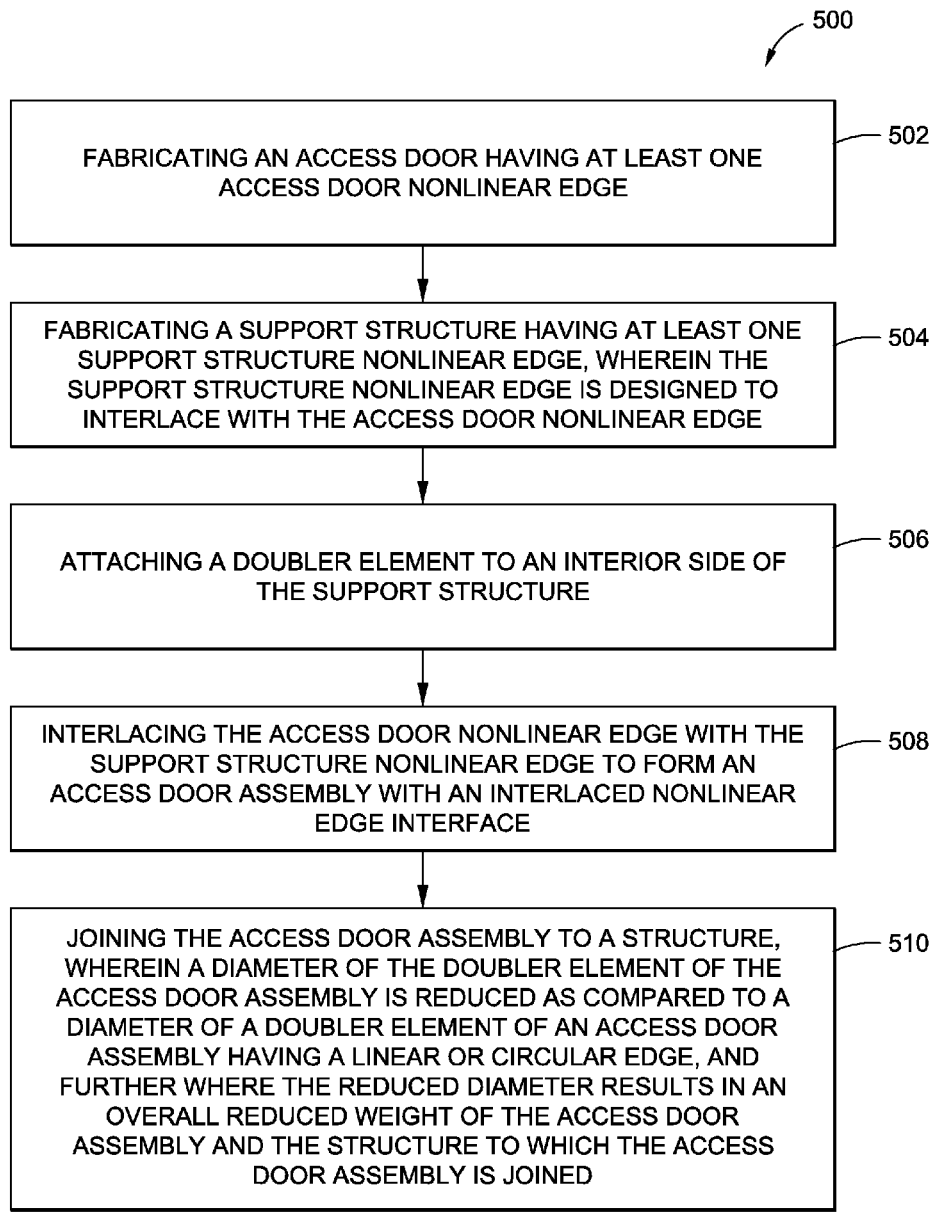

In another embodiment of the disclosure, there is provided a method 500 of making an access door assembly 400 or aircraft access door assembly 401 of the disclosure for joining to a structure 444, such as an aircraft 80 (see FIG. 14). FIG. 19 is an illustration of a flow diagram of an exemplary embodiment of the method 500. The method 500 comprises step 502 of fabricating an access door 402 (see FIG. 16A) having at least one access door nonlinear edge 404 (see FIG. 16A). The access door nonlinear edge 404 preferably has a scalloped edge configuration 406 comprising a plurality of rounded scalloped projections 408 each having an access door opening 410. The access door 402 may be fabricated using fabrication processes known in the art.

The method 500 further comprises step 504 of fabricating a support structure 420 (see FIG. 16A) having at least one support structure nonlinear edge 422 (see FIG. 16B), wherein the support structure nonlinear edge 422 is designed to interlace with the access door nonlinear edge 404. The support structure nonlinear edge 422 preferably has a scalloped edge configuration 424 comprising a plurality of rounded scalloped projections 426 each having a support structure opening 428. The support structure 420 may be fabricated using fabrication processes known in the art.

The method 500 further comprises step 506 of attaching a doubler element 436 (see FIG. 16D) to an interior side 434 (see FIG. 16D) of the support structure 420. The doubler element 436 is preferably permanently attached with fastener elements 458 (see FIG. 16A) such as bolts 459 (see FIG. 17C) or another suitable fastener element and with nuts 469 (see FIG. 17C). Alternatively, instead of fastener elements 458, the support structure 420 may be attached or joined to the doubler element 436 via an adhesive or other chemical bonding element or other suitable fastening mechanism.

The method 500 further comprises step 508 of interlacing the access door nonlinear edge 404 with the support structure nonlinear edge 422 to form an access door assembly 400, such as an aircraft access door assembly 401, with an interlaced nonlinear edge interface 478 (see FIG. 17A).

The method 500 further comprises step 510 of joining the access door assembly 400 to a structure 444, such as an aircraft structural element 446 (see FIG. 16B). The joining step 510 may further comprise removably fastening the access door 402 to the doubler element 436 with a plurality of fastener elements 458 (see FIG. 16A) such as bolts 459 (see FIG. 17B) or another suitable fastener element. A diameter ($d_4$) 456 (see FIG. 16D) of the doubler element 436 of the access door assembly 400 is preferably reduced as compared to a diameter ($d_2$) 340 (see FIG. 15D) of a doubler 318 of a known access door assembly 300 (see FIG. 15A) having a circular edge 303 (see FIG. 15A), or alternatively, a linear edge, such that the reduced diameter ($d_4$) 456 of the doubler element 436 preferably results in an overall reduced weight of the access door assembly 400, such as the aircraft access door assembly 401, and the structure 444 to which the access door assembly 400, such as the aircraft access door assembly 401, is joined.

The access door assembly 400 preferably has a reduced fastener element count to fasten the access door 402 to the doubler element 436 and, in turn, to the structure 444, as compared to a fastener element count to fasten the known access door assembly 300 (see FIG. 15A) having the circular edge 303 (see FIG. 15A), or alternatively, a linear edge. Further, the reduced fastener element count preferably results in an overall reduced weight of the access door assembly 400 and the structure 444 to which the access door assembly 400 is joined. Preferably, the structure 444 comprises an aircraft 80 (see FIG. 14), a spacecraft, a satellite, a rotorcraft, a watercraft, a boat, a train, an automobile, a truck, a bus, a tractor trailer, a building, and an architectural structure.

Disclosed embodiments of the access door assembly 400, the aircraft access door assembly 401, and the method 500 provide a unique edge interface on a non-hinged (nutplate 468 attached) or hinged, removable or attached, access door which allows for a single row of fastener elements 458 and results in a lighter weight access door assembly 400, such as aircraft access door assembly 401. The interlaced nonlinear edge interface 478 or trim pattern, as shown in FIG. 17A, may be used to meet minimum edge margins in both the access door 402 and the surrounding support structure 420. The interlaced nonlinear edge interface 478 or trim pattern allows for a single row of fastener elements 458 to be used, thus reducing the width of the doubler element 436, and also when the surrounding support structure 420 is of a composite sandwich construction, such as the core portion 470 (see FIG. 17B). When rotational orientation is desired, one interlaced portion in the form of the positioning tab portion 462 (see FIG. 17A) or another configuration, can be differentiated from the rounded scalloped projections 408, 426 in order to ensure a particular installation alignment. The resulting size of the maintenance access space is not compromised, as that is dictated by the inner edge of the doubler element 436, and not the interlaced nonlinear edge interface 478 or trim pattern of the access door 402 and support structure 420 interface.

Disclosed embodiments of the access door assembly 400, the aircraft access door assembly 401, and the method 500 may provide a cost savings by reducing the amount of fastener elements 458 that may be required, and may provide a reduction in the labor time and overall manufacturing time to install the fastener elements 458. Disclosed embodiments of the access door assembly 400, the aircraft access door assembly 401, and the method 500 may provide a weight savings by reducing the diameter ($d_4$) 456 (see FIG. 16D) and width of the doubler element 436 and reducing the quantity of fastener elements 458 used. When the surrounding support structure 420 is a composite sandwich structure such as core portion 470 (see FIG. 17A), the width of the solid laminate area for the doubler element 436 to attach to may also be reduced. Such width of the solid laminate area, which is typically heavier due to the higher quantity of plies than over the core portion 470 (see FIG. 17B). Thus, disclosed embodiments of the access door assembly 400, the aircraft access door assembly 401, and the method 500 result in a decrease in cost, weight, and fastener element count.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. An access door assembly for joining to a structure, the access door assembly comprising:
   an access door comprising at least one access door nonlinear edge;
   a support structure comprising at least one support structure nonlinear edge; and,
   a doubler element attached to an interior side of the support structure,
   wherein the at least one support structure nonlinear edge is designed to interlace with the at least one access door nonlinear edge to form the access door assembly for joining to the structure, the access door assembly having an interlaced nonlinear edge interface;
   and further wherein a diameter of the doubler element of the access door assembly is reduced as compared to a diameter of a doubler element of a known access door assembly having a linear or circular edge, such that the reduced diameter results in an overall reduced weight of the access door assembly and the structure to which the access door assembly is joined.

2. The assembly of claim 1 wherein the at least one access door nonlinear edge has a scalloped edge configuration comprising a plurality of rounded scalloped projections each having an access door opening, and the at least one support structure nonlinear edge has a scalloped edge configuration comprising a plurality of rounded scalloped projections each having a support structure opening.

3. The assembly of claim 2 further comprising a plurality of fastener elements configured for insertion through the access door openings and for insertion through corresponding doubler element openings provided in the doubler element in order to attach the access door to the doubler element and, in turn, the structure.

4. The assembly of claim 3 wherein the access door assembly has a reduced fastener element count to fasten the access door to the doubler element and the structure, as compared to a fastener element count to fasten the known access door assembly having the linear or circular edge, and further wherein the reduced fastener element count results in an overall reduced weight of the access door assembly and the structure.

5. The assembly of claim 1 wherein the access door has a plurality of spaced access door openings along the at least one access door nonlinear edge, and the support structure has a plurality of spaced support structure openings along the at least one support structure nonlinear edge, such that when the at least one access door nonlinear edge is interlaced and joined with the at least one support structure nonlinear edge, the spaced access door openings and the spaced support structure openings are aligned in a substantially continuous circle pattern.

6. The assembly of claim 1 wherein the at least one access door nonlinear edge has a positioning tab portion and the at least one support structure nonlinear edge has a corresponding positioning tab portion, such that the positioning tab portion of the at least one access door nonlinear edge is designed to interlace with the corresponding positioning tab portion of the at least one support structure nonlinear edge.

7. The assembly of claim 1 wherein the structure comprises an aircraft structural element and the access door assembly comprises an aircraft access door assembly.

8. The assembly of claim 1 wherein the at least one access door nonlinear edge and the at least one support structure nonlinear edge each have a C-shaped profile.

9. The assembly of claim 1 wherein the at least one access door nonlinear edge is parallel to the at least one support structure nonlinear edge when the at least one access door nonlinear edge is interlaced with the at least one support structure nonlinear edge.

10. The assembly of claim 1 wherein the structure is selected from a group comprising an aircraft, a spacecraft, a satellite, a rotorcraft, a watercraft, a boat, a train, an automobile, a truck, a bus, a tractor trailer, a building, and an architectural structure.

11. An aircraft access door assembly for joining to an aircraft, the aircraft access door assembly comprising:
   an access door comprising a scalloped edge configuration and a plurality of access door openings;
   a support structure comprising a scalloped edge configuration and a plurality of support structure openings; and,
   a doubler element attached to an interior side of the support structure, the doubler element having a plurality of doubler element openings,
   wherein the scalloped edge configuration of the access door is designed to interlace with the scalloped edge configuration of the support structure to form the aircraft access door assembly for joining to an aircraft structure, the aircraft access door assembly having an interlaced scalloped interface;
   a plurality of fasteners for insertion through the access door openings and insertion through the doubler element openings corresponding to the access door openings in order to join the access door to the doubler element and to the aircraft structure;

and further wherein a diameter of the doubler element of the aircraft access door assembly is reduced as compared to a diameter of a doubler element of a known access door assembly having a linear or circular edge, such that the reduced diameter results in an overall reduced weight of the aircraft access door assembly and the aircraft structure to which the aircraft access door assembly is joined.

12. The assembly of claim 11 wherein the access door assembly has a reduced fastener element count to fasten the access door to the doubler element and the structure, as compared to a fastener element count to fasten the known access door assembly having the linear or circular edge, and further wherein the reduced fastener element count results in an overall reduced weight of the access door assembly and the structure.

13. The assembly of claim 11 wherein the access door openings are spaced along the scalloped edge configuration of the access door, and wherein the support structure openings are spaced along the scalloped edge configuration of the support structure, such that when the scalloped edge configuration of the access door is interlaced and joined with the scalloped edge configuration of the support structure, the spaced access door openings and the spaced support structure openings are aligned in a substantially continuous circle pattern.

14. The assembly of claim 11 wherein the scalloped edge configuration of the access door has a positioning tab portion and the scalloped edge configuration of the support structure has a corresponding positioning tab portion, such that the positioning tab portion of the scalloped edge configuration of the access door is designed to interlace with the corresponding positioning tab portion of the scalloped edge configuration of the support structure.

15. A method of making an access door assembly for joining to a structure, the method comprising:
fabricating an access door having at least one access door nonlinear edge;
fabricating a support structure having at least one support structure nonlinear edge, wherein the at least one support structure nonlinear edge is designed to interlace with the at least one access door nonlinear edge;
attaching a doubler element to an interior side of the support structure;
interlacing the at least one access door nonlinear edge with the at least one support structure nonlinear edge to form the access door assembly with an interlaced nonlinear edge interface; and,
joining the access door assembly to the structure,
wherein a diameter of the doubler element of the access door assembly is reduced as compared to a diameter of a doubler element of an access door assembly having a linear or circular edge, and further wherein the reduced diameter results in an overall reduced weight of the access door assembly and the structure to which the access door assembly is joined.

16. The method of claim 15 wherein the at least one access door nonlinear edge has a scalloped edge configuration comprising a plurality of rounded scalloped projections each having an access door opening, and the at least one support structure nonlinear edge has a scalloped edge configuration comprising a plurality of rounded scalloped projections each having a support structure opening.

17. The method of claim 15 wherein joining the access door assembly to the structure comprises fastening the access door to the doubler element with a plurality of fastener elements.

18. The method of claim 17 wherein the access door assembly has a reduced fastener element count to fasten the access door to the doubler element and, in turn, the structure, as compared to a fastener element count to fasten the known access door assembly having the linear or circular edge, and further wherein the reduced fastener element count results in an overall reduced weight of the access door assembly and the structure.

19. The method of claim 15 wherein the at least one access door nonlinear edge has a positioning tab portion and the at least one support structure nonlinear edge has a corresponding positioning tab portion, such that the positioning tab portion of the at least one access door nonlinear edge is designed to interlace with the corresponding positioning tab portion of the at least one support structure nonlinear edge.

20. The method of claim 15 wherein the access door has a plurality of spaced access door openings along the at least one access door nonlinear edge, and the support structure has a plurality of spaced support structure openings along the at least one support structure nonlinear edge, such that when the at least one access door nonlinear edge is interlaced and joined with the at least one support structure nonlinear edge, the spaced access door openings and the spaced support structure openings are aligned in a substantially continuous circle pattern.

21. The method of claim 15 wherein the at least one access door nonlinear edge is parallel to the at least one support structure nonlinear edge when the at least one access door nonlinear edge is interlaced with the at least one support structure nonlinear edge.

22. The assembly of claim 15 wherein the structure is selected from a group comprising an aircraft, a spacecraft, a satellite, a rotorcraft, a watercraft, a boat, a train, an automobile, a truck, a bus, a tractor trailer, a building, and an architectural structure.

* * * * *